(12) United States Patent
Walker et al.

(10) Patent No.: US 8,620,819 B2
(45) Date of Patent: Dec. 31, 2013

(54) REMOTE FEATURE ACTIVATOR FEATURE EXTRACTION

(75) Inventors: William T. Walker, Evergreen, CO (US); Bruce G. Lieou, Highlands Ranch, CO (US); Mary K. Lourenco, Centennial, CO (US); Robert J. Serkowski, Broomfield, CO (US); Leslie Levy, White Plains, NY (US)

(73) Assignee: Avaya Inc., Basking Ridge, NJ (US)

( * ) Notice: Subject to any disclaimer, the term of this patent is extended or adjusted under 35 U.S.C. 154(b) by 444 days.

(21) Appl. No.: 12/609,846

(22) Filed: Oct. 30, 2009

(65) Prior Publication Data

US 2010/0049725 A1 Feb. 25, 2010

Related U.S. Application Data

(62) Division of application No. 10/232,906, filed on Aug. 30, 2002, now Pat. No. 7,681,245.

(51) Int. Cl.
*G06F 21/00* (2013.01)

(52) U.S. Cl.
USPC .................. 705/59; 726/30; 705/55; 707/703; 707/948; 707/950

(58) Field of Classification Search
USPC .......... 705/55, 59; 707/703, 948, 950; 726/30
See application file for complete search history.

(56) References Cited

U.S. PATENT DOCUMENTS 4,288,659 A 9/1981 Atalla
4,405,829 A 9/1983 Rivest et al.
4,780,821 A 10/1988 Crossley
4,811,393 A 3/1989 Hazard
4,888,800 A 12/1989 Marshall et al.
4,937,863 A 6/1990 Robert et al.
5,005,122 A 4/1991 Griffin et al.
5,023,907 A 6/1991 Johnson et al.
5,157,663 A 10/1992 Major et al.

(Continued)

FOREIGN PATENT DOCUMENTS

EP 1071253 1/2001
EP 1562378 8/2005
JP 2006/085481 3/2006

OTHER PUBLICATIONS

Official Action for U.S. Appl. No. 11/928,815, mailed Jan. 25, 2010.

(Continued)

*Primary Examiner* — Cheyne D Ly
(74) *Attorney, Agent, or Firm* — Sheridan Ross P.C.

(57) ABSTRACT

A database record controls a license to use a computational component. An input receives an order identifier associated with an order related to a computational component and an interface retrieves order information associated with the identifier. The order information comprises at least one material code. A material code mapping agent compares the material code with at least one material code mapping table to identify corresponding computational component information associated with the material code. In another configuration, a transaction record includes first information associated with the order, the order relates to at least a first computational component and/or feature thereof, a configuration file includes second information different from the first information, the configuration file relates to at least one telecommunication switch/server, and a configuration file processing agent compares some of the first information with some of the second information to form a system record having both first and second information.

8 Claims, 12 Drawing Sheets

(56) References Cited

U.S. PATENT DOCUMENTS

| | | | |
|---|---|---|---|
| 5,179,591 A | 1/1993 | Hardy et al. | |
| 5,204,897 A | 4/1993 | Wyman | |
| 5,206,903 A | 4/1993 | Kohler et al. | |
| 5,230,020 A | 7/1993 | Hardy et al. | |
| 5,260,999 A | 11/1993 | Wyman | |
| 5,307,481 A | 4/1994 | Shimazaki et al. | |
| 5,329,570 A | 7/1994 | Glassmacher et al. | |
| 5,341,427 A | 8/1994 | Hardy et al. | |
| 5,347,580 A | 9/1994 | Molva et al. | |
| 5,386,369 A | 1/1995 | Christiano | |
| 5,390,297 A | 2/1995 | Barber et al. | |
| 5,408,649 A | 4/1995 | Beshears et al. | |
| 5,448,639 A | 9/1995 | Arazi | |
| 5,553,143 A | 9/1996 | Ross et al. | |
| 5,563,946 A | 10/1996 | Cooper et al. | |
| 5,579,222 A | 11/1996 | Bains et al. | |
| 5,629,980 A | 5/1997 | Stefik et al. | |
| 5,646,992 A | 7/1997 | Subler et al. | |
| 5,671,412 A | 9/1997 | Christiano | |
| 5,673,315 A | 9/1997 | Wolf | |
| 5,699,431 A | 12/1997 | Van Oorschot et al. | |
| 5,708,709 A | 1/1998 | Rose | |
| 5,717,604 A | 2/1998 | Wiggins | |
| 5,724,428 A | 3/1998 | Rivest | |
| 5,742,757 A | 4/1998 | Hamadani et al. | |
| 5,745,569 A | 4/1998 | Moskowitz et al. | |
| 5,745,576 A | 4/1998 | Abraham et al. | |
| 5,745,879 A | 4/1998 | Wyman | |
| 5,754,761 A | 5/1998 | Willsey | |
| 5,758,068 A | 5/1998 | Brandt et al. | |
| 5,758,069 A | 5/1998 | Olsen | |
| 5,790,074 A | 8/1998 | Rangedahl et al. | |
| 5,790,664 A | 8/1998 | Coley et al. | |
| 5,796,941 A | 8/1998 | Lita | |
| 5,828,747 A | 10/1998 | Fisher et al. | |
| 5,835,600 A | 11/1998 | Rivest | |
| 5,864,620 A | 1/1999 | Pettitt | |
| 5,905,793 A | 5/1999 | Flockhart et al. | |
| 5,905,860 A | 5/1999 | Olsen et al. | |
| 5,935,243 A | 8/1999 | Hasebe et al. | |
| 5,940,504 A | 8/1999 | Griswold | |
| 5,956,505 A | 9/1999 | Manduley | |
| 5,956,716 A | 9/1999 | Kenner et al. | |
| 5,960,085 A | 9/1999 | de la Huerga | |
| 5,978,565 A | 11/1999 | Ohran et al. | |
| 5,982,873 A | 11/1999 | Flockhart et al. | |
| 5,995,625 A | 11/1999 | Sudia et al. | |
| 6,006,016 A | 12/1999 | Faigon et al. | |
| 6,009,401 A | 12/1999 | Horstmann | |
| 6,011,973 A | 1/2000 | Valentine et al. | |
| 6,023,763 A | 2/2000 | Grumstrup et al. | |
| 6,023,766 A | 2/2000 | Yamamura | |
| 6,047,242 A | 4/2000 | Benson | |
| 6,067,621 A | 5/2000 | Yu et al. | |
| 6,108,703 A | 8/2000 | Leighton et al. | |
| 6,128,389 A | 10/2000 | Chan et al. | |
| 6,134,660 A | 10/2000 | Boneh et al. | |
| 6,148,415 A | 11/2000 | Kobayashi et al. | |
| 6,163,607 A | 12/2000 | Bogart et al. | |
| 6,173,053 B1 | 1/2001 | Bogart et al. | |
| 6,178,511 B1 | 1/2001 | Cohen et al. | |
| 6,189,146 B1 | 2/2001 | Misra et al. | |
| 6,192,122 B1 | 2/2001 | Flockhart et al. | |
| 6,212,635 B1 | 4/2001 | Reardon | |
| 6,219,652 B1 | 4/2001 | Carter et al. | |
| 6,223,291 B1 | 4/2001 | Puhl et al. | |
| 6,246,871 B1 | 6/2001 | Ala-Laurila | |
| 6,314,565 B1 | 11/2001 | Kenner et al. | |
| 6,343,280 B2 | 1/2002 | Clark | |
| 6,360,320 B1 | 3/2002 | Ishiguro et al. | |
| 6,381,747 B1 | 4/2002 | Wonfor et al. | |
| 6,414,595 B1 | 7/2002 | Scrandis et al. | |
| 6,421,726 B1 | 7/2002 | Kenner et al. | |
| 6,442,708 B1 | 8/2002 | Dierauer et al. | |
| 6,463,534 B1 | 10/2002 | Geiger et al. | |
| 6,498,791 B2 | 12/2002 | Pickett | |
| 6,502,079 B1 | 12/2002 | Ball et al. | |
| 6,513,117 B2 | 1/2003 | Tarpenning et al. | |
| 6,513,121 B1 | 1/2003 | Serkowski | |
| 6,539,481 B1 | 3/2003 | Takahashi et al. | |
| 6,557,105 B1 | 4/2003 | Tardo et al. | |
| 6,574,612 B1 | 6/2003 | Baratti et al. | |
| 6,584,454 B1 | 6/2003 | Hummel, Jr. et al. | |
| 6,615,347 B1 | 9/2003 | de Silva et al. | |
| 6,640,305 B2 | 10/2003 | Kocher et al. | |
| 6,654,888 B1 | 11/2003 | Cooper et al. | |
| 6,675,208 B1 | 1/2004 | Rai et al. | |
| 6,697,945 B2 | 2/2004 | Ishiguro et al. | |
| 6,704,885 B1 | 3/2004 | Salas-Meza et al. | |
| 6,760,324 B1 | 7/2004 | Scott et al. | |
| 6,765,492 B2 | 7/2004 | Harris | |
| 6,769,063 B1 | 7/2004 | Kanda et al. | |
| 6,772,133 B1 | 8/2004 | Kambayashi et al. | |
| 6,775,782 B1 | 8/2004 | Buros et al. | |
| 6,778,820 B2 | 8/2004 | Tendler | |
| 6,785,726 B1 | 8/2004 | Freeman et al. | |
| 6,795,941 B2 | 9/2004 | Nickels | |
| 6,816,842 B1 | 11/2004 | Singh et al. | |
| 6,826,606 B2 | 11/2004 | Freeman et al. | |
| 6,842,896 B1 | 1/2005 | Redding et al. | |
| 6,850,958 B2 | 2/2005 | Wakabayashi | |
| 6,854,010 B1 | 2/2005 | Christian et al. | |
| 6,868,403 B1 | 3/2005 | Wiser et al. | |
| 6,876,984 B2 | 4/2005 | Tadayon et al. | |
| 6,883,095 B2 | 4/2005 | Sandhu et al. | |
| 6,889,212 B1 | 5/2005 | Wang et al. | |
| 6,901,386 B1 | 5/2005 | Dedrick et al. | |
| 6,904,523 B2 | 6/2005 | Bialick et al. | |
| 6,920,567 B1* | 7/2005 | Doherty et al. ............... 726/22 |
| 6,928,166 B2 | 8/2005 | Yoshizawa | |
| 6,928,558 B1 | 8/2005 | Allahwerdi et al. | |
| 6,934,463 B2 | 8/2005 | Ishiguro et al. | |
| 6,934,848 B1 | 8/2005 | King et al. | |
| 6,941,283 B2 | 9/2005 | Kambayashi et al. | |
| 6,957,344 B1 | 10/2005 | Goldshlag et al. | |
| 6,959,291 B1 | 10/2005 | Armstrong et al. | |
| 6,961,858 B2 | 11/2005 | Fransdonk | |
| 6,968,384 B1 | 11/2005 | Redding et al. | |
| 6,973,444 B1 | 12/2005 | Blinn et al. | |
| 6,976,164 B1 | 12/2005 | King et al. | |
| 6,981,222 B2 | 12/2005 | Rush et al. | |
| 6,993,664 B2 | 1/2006 | Padole et al. | |
| 7,032,113 B2 | 4/2006 | Pendlebury | |
| 7,035,918 B1 | 4/2006 | Redding et al. | |
| 7,065,214 B2 | 6/2006 | Ishiguro et al. | |
| 7,069,468 B1 | 6/2006 | Olson et al. | |
| 7,073,063 B2 | 7/2006 | Peinado | |
| 7,080,402 B2 | 7/2006 | Bates et al. | |
| 7,085,382 B2 | 8/2006 | Terao et al. | |
| 7,096,469 B1 | 8/2006 | Kubala et al. | |
| 7,100,044 B2 | 8/2006 | Watanabe et al. | |
| 7,100,200 B2 | 8/2006 | Pope et al. | |
| 7,124,304 B2 | 10/2006 | Bel et al. | |
| 7,127,442 B2 | 10/2006 | Mazza et al. | |
| 7,139,737 B2 | 11/2006 | Takahashi et al. | |
| 7,143,409 B2 | 11/2006 | Herrero | |
| 7,146,340 B1 | 12/2006 | Musson | |
| 7,149,806 B2 | 12/2006 | Perkins et al. | |
| 7,152,245 B2 | 12/2006 | Dublish et al. | |
| 7,171,662 B1 | 1/2007 | Misra et al. | |
| 7,185,195 B2 | 2/2007 | Hug et al. | |
| 7,197,321 B2 | 3/2007 | Erskine et al. | |
| 7,206,936 B2 | 4/2007 | Aull et al. | |
| 7,216,363 B2 | 5/2007 | Serkowski et al. | |
| 7,225,333 B2 | 5/2007 | Peinado et al. | |
| 7,228,426 B2 | 6/2007 | Sinha et al. | |
| 7,228,567 B2 | 6/2007 | Serkowski et al. | |
| 7,272,500 B1 | 9/2007 | Walker | |
| 7,278,164 B2 | 10/2007 | Raiz et al. | |
| 7,283,519 B2 | 10/2007 | Girard | |
| 7,302,703 B2 | 11/2007 | Burns | |
| 7,308,717 B2 | 12/2007 | Koved et al. | |
| 7,310,734 B2 | 12/2007 | Boate et al. | |
| 7,313,828 B2 | 12/2007 | Holopainen | |

(56) References Cited

U.S. PATENT DOCUMENTS

| | | | |
|---|---|---|---|
| 7,318,236 B2 | 1/2008 | DeMello et al. |
| 7,336,791 B2 | 2/2008 | Ishiguro |
| 7,353,388 B1 | 4/2008 | Gilman |
| 7,356,692 B2 | 4/2008 | Bialick et al. |
| 7,373,657 B2 | 5/2008 | Walker |
| 7,382,881 B2 | 6/2008 | Uusitalo et al. |
| 7,383,205 B1 | 6/2008 | Peinado et al. |
| 7,415,729 B2 | 8/2008 | Ukeda et al. |
| 7,545,931 B2 | 6/2009 | Dillaway |
| 7,552,166 B2 | 6/2009 | Chack |
| 7,565,325 B2 | 7/2009 | Lenard et al. |
| 7,716,348 B1 | 5/2010 | Redding et al. |
| 2001/0001268 A1 | 5/2001 | Menon et al. |
| 2001/0013024 A1* | 8/2001 | Takahashi et al. ............ 705/59 |
| 2001/0034846 A1 | 10/2001 | Beery |
| 2002/0010681 A1 | 1/2002 | Hillegass et al. |
| 2002/0013722 A1 | 1/2002 | Kanaga |
| 2002/0017977 A1 | 2/2002 | Wall |
| 2002/0038422 A1 | 3/2002 | Suwamoto et al. |
| 2002/0052939 A1 | 5/2002 | Lee |
| 2002/0083003 A1 | 6/2002 | Halliday et al. |
| 2002/0087892 A1 | 7/2002 | Imazu |
| 2002/0107809 A1 | 8/2002 | Biddle et al. |
| 2002/0112186 A1 | 8/2002 | Ford et al. |
| 2002/0116340 A1 | 8/2002 | Hellberg et al. |
| 2002/0138441 A1 | 9/2002 | Lopatic |
| 2002/0154777 A1 | 10/2002 | Candelore |
| 2002/0169625 A1 | 11/2002 | Yang et al. |
| 2002/0169725 A1 | 11/2002 | Eng |
| 2002/0188656 A1 | 12/2002 | Patton et al. |
| 2002/0188704 A1 | 12/2002 | Gold |
| 2003/0013411 A1 | 1/2003 | Uchiyama |
| 2003/0018491 A1 | 1/2003 | Nakahara et al. |
| 2003/0018582 A1 | 1/2003 | Yaacovi |
| 2003/0023564 A1 | 1/2003 | Padhye et al. |
| 2003/0055749 A1 | 3/2003 | Carmody et al. |
| 2003/0084306 A1 | 5/2003 | Abburi et al. |
| 2003/0095542 A1 | 5/2003 | Chang et al. |
| 2003/0144959 A1 | 7/2003 | Makita |
| 2003/0149670 A1 | 8/2003 | Cronce |
| 2003/0149874 A1 | 8/2003 | Balfanz et al. |
| 2003/0156719 A1 | 8/2003 | Cronce |
| 2003/0159033 A1 | 8/2003 | Ishiguro |
| 2003/0159070 A1 | 8/2003 | Mayer et al. |
| 2003/0163428 A1 | 8/2003 | Schneck et al. |
| 2003/0172035 A1 | 9/2003 | Cronce et al. |
| 2003/0177393 A1 | 9/2003 | Ishiguro |
| 2003/0191936 A1 | 10/2003 | Kawatsura et al. |
| 2003/0208449 A1 | 11/2003 | Diao |
| 2003/0217163 A1* | 11/2003 | Lagerweij et al. ............ 709/229 |
| 2003/0233547 A1 | 12/2003 | Gaston et al. |
| 2004/0003269 A1 | 1/2004 | Waxman et al. |
| 2004/0010440 A1 | 1/2004 | Lenard et al. |
| 2004/0010469 A1 | 1/2004 | Lenard et al. |
| 2004/0039916 A1 | 2/2004 | Aldis et al. |
| 2004/0044629 A1 | 3/2004 | Walker et al. |
| 2004/0044630 A1 | 3/2004 | Walker et al. |
| 2004/0044631 A1 | 3/2004 | Walker et al. |
| 2004/0047354 A1 | 3/2004 | Slater et al. |
| 2004/0054930 A1 | 3/2004 | Walker et al. |
| 2004/0073517 A1 | 4/2004 | Zunke et al. |
| 2004/0078339 A1 | 4/2004 | Goringe et al. |
| 2004/0088541 A1 | 5/2004 | Messerges et al. |
| 2004/0103011 A1 | 5/2004 | Hatano et al. |
| 2004/0103324 A1 | 5/2004 | Band |
| 2004/0127196 A1 | 7/2004 | Dabbish et al. |
| 2004/0128395 A1 | 7/2004 | Miyazaki |
| 2004/0128551 A1 | 7/2004 | Walker et al. |
| 2004/0133794 A1 | 7/2004 | Kocher et al. |
| 2004/0162998 A1 | 8/2004 | Tuomi et al. |
| 2004/0172367 A1 | 9/2004 | Chavez |
| 2004/0181696 A1 | 9/2004 | Walker |
| 2004/0249763 A1 | 12/2004 | Vardi |
| 2004/0260589 A1 | 12/2004 | Varadarajan et al. |
| 2004/0268120 A1 | 12/2004 | Mirtal et al. |
| 2005/0005098 A1 | 1/2005 | Michaelis et al. |
| 2005/0038753 A1 | 2/2005 | Yen et al. |
| 2005/0076204 A1 | 4/2005 | Thornton et al. |
| 2005/0086174 A1 | 4/2005 | Eng |
| 2005/0091507 A1 | 4/2005 | Lee et al. |
| 2005/0144437 A1 | 6/2005 | Ransom et al. |
| 2005/0154877 A1 | 7/2005 | Trench |
| 2005/0185792 A1 | 8/2005 | Tokutani et al. |
| 2005/0198510 A1 | 9/2005 | Robert et al. |
| 2005/0202830 A1 | 9/2005 | Sudit |
| 2005/0229004 A1 | 10/2005 | Callaghan |
| 2005/0246098 A1 | 11/2005 | Bergstrom et al. |
| 2005/0289072 A1 | 12/2005 | Sabharwal |
| 2006/0021068 A1 | 1/2006 | Xu et al. |
| 2006/0026105 A1 | 2/2006 | Endoh |
| 2006/0036554 A1 | 2/2006 | Schrock et al. |
| 2006/0036894 A1 | 2/2006 | Bauer et al. |
| 2006/0064582 A1 | 3/2006 | Teal et al. |
| 2006/0089912 A1 | 4/2006 | Spagna et al. |
| 2006/0178953 A1 | 8/2006 | Aggarwal et al. |
| 2006/0184454 A1* | 8/2006 | Ananda ............................ 705/57 |
| 2006/0190409 A1 | 8/2006 | Hillegass et al. |
| 2006/0242083 A1 | 10/2006 | Chavez |
| 2006/0294010 A1 | 12/2006 | Kim et al. |
| 2007/0033419 A1 | 2/2007 | Kocher et al. |
| 2007/0094710 A1 | 4/2007 | Walker et al. |
| 2007/0107067 A1 | 5/2007 | Fountian |
| 2007/0219917 A1 | 9/2007 | Liu et al. |
| 2008/0052295 A1 | 2/2008 | Walker et al. |
| 2008/0082449 A1 | 4/2008 | Wilkinson et al. |
| 2008/0141242 A1 | 6/2008 | Shapiro |
| 2008/0189131 A1 | 8/2008 | Chavez |

OTHER PUBLICATIONS

US 5,742,747, 4/1998, Hamadani et al. (withdrawn).
"RightNow Technologies and MarketFirst Partnership Delivers Complete E-Marketing Solution", PR Newsire, Aug. 14, 2001, p. 1.
White, Ron. How Computers Work, Millennium Edition. Que Publishing, 1999. Front Matter, Back matter, and pp. 4-13,36-37,106-111, and 122-133 included.
Stevens, W. Richard. Advanced Programming in the UNIX Environment. Addison-Wesley, 1993. Front matter, back matter ,and pp. 18-21 included.
Notice of Allowability for U.S. Appl. No. 11/928,815, mailed Jul. 26, 2010.
U.S. Appl. No. 10/947,418, filed Sep. 21, 2004, Gilman.
U.S. Appl. No. 10/956,861, filed Sep. 30, 2004, Robinson.
U.S. Appl. No. 11/051,316, filed Feb. 4, 2005, Mazza.
U.S. Appl. No. 11/222,997, filed Sep. 8, 2005, Rao.
ADTech Engineering, "IP Phone SI-160 User Manual (SCCP releases)," Version 1.2 (2002), pp. 1-20.
Arsys, "Public Key Infrastructure," (Feb. 4, 2001), available at http://www.transactiontrust.com/technicaindex.html, 4 pages.
Articsoft Limited, "Public Key Infrastructure (PKI) FAQs" (Feb. 2, 2003), available at http://www.articsoft.com/wp_pki_faq.htm, 5 pages.
Clarke, Roger, "Centrelink Smart Card Technical Issues Starter Kit Chapter 7" (Apr. 8, 1998) at http://www.anu.edu.au/people/Roger.Clarke/DV/SCTISK.html, pp. 1-3.
Datakey, "Securing a Virtual Private Network withSmart Card Technology", Aug. 1, 2002; available at www.datakey.com, pp. 1-8.
"Digital Cinema Key Management Messages," Draft 1 (Aug. 8, 2002), pp. 1-9.
Discerning the Times Digest and Newsbytes, "Global Control of All Buying and Selling Now Possible," vol. 1 Iss. 1 (Jan. 2000), available at http://www.discerningtoday.org/members/Digest/2000Digest/January/Global%20Control.htm, 2 pages.
Entrust Inc., "Entrust Authority Security Manager," (printed Aug. 13, 2004), avaiable at http://www.entrust.com/authority/manager/index.htm, 23 pages.
Giswold, Robert S., "Get Smart: The Coming Revolution of Smart Cards," Journal of Property Management (May/Jun. 1997), 5 pages.
Info Merchant Store, "VeriFone 2000, MS/DUKPT/STD Pin Pad, New" (printed Feb. 17, 2004), avaiable at http://www.merchantamerica.com/creditcardterminals/index.php?ba=product_enlarge&product=96 32, 1 page.

(56) References Cited

OTHER PUBLICATIONS

Infosec Engineering, "Building a Corporate Public Key Infrastructure" (1999), available at http://www.infoseceng.com/corppki.htm, 20 pages.
LockStream Corporation, "Catalyst DRM Service Platform"; available at http://www.lockstream.com/products_spcm.php, 1 page; 2003.
LockStream Corporation, "Lockstream KeyDRM"; available at http://www.lockstream.com/products_1gm.php, 2 pages; 2003.
LockStream Corporation, "Lockstream OMA 1.0 DRM Client", available at http://www.lockstream.com/products_sprm.php, 2 pages; 2003.
LockStream Corporation, Catalyst DRM Service Platform Architecture, Vers. 1.0 (Nov. 2003), pp. 1-28.
Microsoft Corporation, "Accessing a Smart Card" (Aug. 2002), avaiable at http://msdn.microsoft.com/library/en-us/security/security/accessing_a_smart_card.asp, p. 1.
Microsoft Corporation, "Base Service Providers" (Aug. 2002), avaiable at http://msdn.microsoft.com/library/en-us/security/security/base_service_providers.asp, p. 1.
Microsoft Corporation, "Building an ISO7816-4 APDU Command" (Aug. 2002), avaiable at http://msdn.microsoft.com/library/en-us/security/security/building_an_iso7816_4_apdu_command.asp, pp. 1-2.
Microsoft Corporation, "Introducing Smart Cards to theSystem" (Aug. 2002), avaiable at http://msdn.microsoft.com/library/en-us/security/security/introducing_smart_cards_to_the_system.asp, p. 1.
Microsoft Corporation, "Primary Service Provider" (Aug. 2002), avaiable at http://msdn.microsoft.com/library/en-us/security/security/primary_service_providerasp, p. 1.
Microsoft Corporation, "Smart Card Authentication" (Aug. 2002), avaiable at http://msdn.microsoft.com/library/en-us/security/security/smart_card_authentication.asp, pp. 1-2.
Microsoft Corporation, "Smart Card Interfaces" (Aug. 2002), avaiable at http://msdn.microsoft.com/library/en-us/security/security/smart_card_interfaces.asp, pp. 1-2.
Microsoft Corporation, "Smart Card Resource Manager" (Aug. 2002), avaiable at http://msdn.microsoft.com/library/en-us/security/security/smart_card_resource_manager.asp, pp. 1.
Microsoft Corporation, "Smart Card Service Providers" (Aug. 2002), avaiable at http://msdn.microsoft.com/library/en-us/security/security/smart_card_service_providers.asp, pp. 1.
Microsoft Corporation, "Smart Card User Interface" (Aug. 2002), avaiable at http://msdn.microsoft.com/library/en-us/security/security/smart_card_user_interface.asp, pp. 1.
Microsoft Corporation, "Vendor Wrapper Service Providers" (Aug. 2002), avaiable at http://msdn.microsoft.com/library/en-us/security/security/vendor_wrapper_service_providers.asp, pp. 1.
MIT Laboratory for Computer Science, "The Cricket Indoor Location System," An NMS Project (printed Jul. 31, 2002), available at http://nms.lcs.mit.edu/projects/cricket/, 5 pages.
Motorola Press Release, "ERG Motorola Alliance Receives Award for Smart Card" (Jun. 6, 2000), available at http://motorola.com/LMPS/pressreleases/page88.htm, 3 pages.
NEC Infrontia Corporation Press Release, "Establishment of "SmartCardInfrontia" solutions for 'IC card'," (Mar. 13, 2002), 4 pages.
NetLingo Dictionary of Internet Words, "Smart Card" (1995-2004), available at http://www.netlingo.com/lookup.cfm?term=smart+card, 2 pages.
Novell®, "Certificate Server: Public Key Infrastructure," White Paper (1999), pp. 1-10.
Rankl, Wolfgang, "Smart Card Handbook,", available at http://www.wrankl.de/SCH/SCH.html, 8 pages; 1998-2004.
Russinovich, Mark, "Inside Encrypting Fily System, Part 1, "Windows & .NET Magazine (Jun. 1999), available at http://www.winntmag.com/Articles/Index.cfm?ArticleID=5387&Key=Internals, 4 pages.
Russinovich, Mark, "Inside Encrypting Fily System, Part 2,"Windows & .NET Magazine (Jul. 1999), available at http://www.winntmag.com/Articles/Index.cfm?ArticleID=5592&Key=Internals, 5 pages.
Security Config, Back Up Your Encrypting File System Private Key in Windows 2000 Download; avaiable at http://www.securityconfig.com/software/alerts/back_up_your_encrypting_file_system_private_key_in_windows_2000.html, 2 pages; 2003.
Smart Card Alliance Industry News, "Cubic Corp. Intoduces New National Security and Homeland Defense" (Sep. 9, 2002), avaiable at http://www.smartcardalliance.org/industry_news/industry_news_item.cfm?itemID=310, 2 pages.
Smart Card Alliance Industry News, "Cubic Introduces New Mobile Ticketing Machine" (Jul. 3, 2003), avaiable at http://www.smartcardalliance.org/industry_news/industry_news_item.cfm?itemID=852, 2 pages.
SSH Communications Security Corp., "Enabling Virtual Public Networks with Public Key Infrastructure," White Paper (Jan. 2004), pp. 1-9.
Streetman, Kibbee K. et al., "Public Key Infrastructure: Resources, Requirements and Recommendations," ATI IPT Special Report 00-06 (Apr. 20000), pp. 145.
Sun Developer Network, "Smart Card Overview," Sun Microsystems, Inc. (1994-2004), avaiable at http://java.sun.com/products/javacard/smartcards.html, 2 pages.
VeriFone Inc., "VeriFone Payment Solutions: Point-of-Sale PINpads" (1997-2004), available at http://www.verifone.com/products/printers_peripherals/html/pinpad_family.html, 1 page.
Whatis.com Target SearchTM, "PKI" (Jan. 13, 2004), available at http://whatis.techtarget.com/definition/0,2989893,sid9_gci214299,00.html, 4 pages.
Microsoft Software Piracy Protection "Product Activation Facts", at http://www.microsoft.com/piracy/activation_faq.mspx, Copyright 2005, 10 pages.
SIP.edu Cookbook, "SIP.edu and Avaya Converged Community Server", at http://mit.edu/sip/sip.edu/avaya.shtml, (Nov. 2004, Mar. 2005) 19 pages.
Sun Microsystems, Inc. Java Cryptography Architecture API Specification & Reference, Aug. 4, 2002, 56 pages.
MATLAB Installation Guide for PC, Release 11, The MathWorks Inc, 1999.
Microsoft Systems Management Server 2.0 Resource Guide, Microsoft Press, 1999. ISBN 0-7356-0583-1.
Windows NT Server 4. Garms, Jason. SAMS Publishing, 1998. ISBN 0-672-31249-2.
Java Skyline: Java Servlet/Server Headline News, Oct. through Dec. 1998, pp. 1-3.
FLEXIm End Users Guide, Version 9.2. Jul. 2003. Published by Macrovision. 166 pages.
A. Menezes, P. van Oorschot and S. Vanstone, Handbook of Applied Cryptography, cr8523_01[1].pdf, Chapter 1, 48 pages.
A. Menezes, P. van Oorschot and S. Vanstone, Handbook of Applied Cryptography, cr8523_1 0[1].pdf, Chapter 10, 40 pages.
A. Menezes, P. van Oorschot and S. Vanstone, Handbook of Applied Cryptography, cr8523_12[1].pdf, Chapter 12, 53 pages.
Bowman, Louise, Smart Cards Go Corporate (Andrew Phillips from Dataquest forecasts the number of smart cards corporations will buy to increase to 91.9 mil by 2004 from a total of 230,000 in 2000), Oct. 2000, Thomson Media, Oct. 2000, pp. 1-6.
Kuchinskas, Susan, Keeping content safe is a big job and everyone has to do it: the security of its corporate content can make or break Topps. (Topps employs security consultant to watch network traffic), Jul. 2003, 2003 Online, Inc., Jul. 2003, pp. 1-5.
Multos Fights On, Jan. 2004, Thomson Media, Inc., Jan. 2004, pp. 1-7.
Official Action for U.S. Appl. No. 10/232,906, mailed Jun. 30, 2008.
Official Action for U.S. Appl. No. 10/232,906, mailed Dec. 12, 2007.
Official Action for U.S. Appl. No. 10/232,906, mailed May 15, 2007.
Official Action for U.S. Appl. No. 10/232,906, mailed Dec. 19, 2006.
Official Action for U.S. Appl. No. 10/232,906, mailed Jul. 5, 2006.

(56) References Cited

OTHER PUBLICATIONS

Official Action for U.S. Appl. No. 10/232,906, mailed Mar. 27, 2006.
Official Action for U.S. Appl. No. 10/232,906, mailed Dec. 23, 2008.
Notice of Allowance for U.S. Appl. 10/232,906, mailed Oct. 6, 2009.
Official Action for U.S. Appl. No. 10/232,906, mailed Jul. 22, 2009.
Background of the Invention for the above-captioned patent application (previously provided).
Corrected Notice of Allowance for U.S. Appl. No. 10/232,906, mailed Nov. 30, 2009.

* cited by examiner

| FEATURE KEYWORD | TITLE STRING ON SAT SCREEN | PAGE | FID | FEATURE SETTING | PLATFORM APPLICABILITY |
|---|---|---|---|---|---|
| FEAT_A | XXXX | A | 1111 | COPY | N |
| ⋮ | ⋮ | ⋮ | ⋮ | ⋮ | ⋮ |
| FEAT_N | YYYY | N | 2222 | IF FEAT_A AND FEAT_B ARE "ON" THEN SET TO "ON"; OTHERWISE SET TO "OFF". | |
| ↑ | ↑ | ↑ | ↑ | ↑ | ↑ |
| 400 | 404 | 408 | 412 | 416 | 420 |

| FEATURE KEYWORD | TITLE STRING ON SAT SCREEN | PAGE | FID | FEATURE VALUE |
|---|---|---|---|---|
| VALUE_A | XXXX | A | 2223 | COPY |
| ⋮ | ⋮ | ⋮ | ⋮ | ⋮ |
| VALUE_N | YYYY | N | 3333 | IF FEAT_D IS "OFF" THEN SET TO "0"; OTHERWISE COPY. |
| ↑ | ↑ | ↑ | ↑ | ↑ |
| 424 | 428 | 432 | 436 | 440 |

System ID — 700
Sold-to Customer Information — 704
Distributor Information — 708
Dealer Information — 712
End Customer Information — 716
Authorized User Access Information — 720
License Generation Information — 724
    Platform Type — 728
    Serial Number — 732
    PID — 736
    Application Name — 740
    Software Version — 744
    Expiration Date — 748
Type I Feature Information — 752
    Type I ON/OFF Feature Settings - Right to Use — 756
    Type I ON/OFF Feature Settings - Features Activated — 760
Type II Feature Information — 764
    Type II Value Feature Right to Use — 768
    Type II Value Feature Range — 772
    Type II Value Feature Setting — 776
Type III Feature Information — 780
    Type III Registration Feature Right to Use — 784
    Type III Registration Feature Release — 788
    Type III Registration Feature Range — 792
    Type III Registration Feature Setting — 796
License Delivery Information — 797
Module Information — 798
Application Information — 799
System Record History — 789

*FIG. 7*

| MATERIAL CODE | DESCRIPTION | PLATFORM | MODULE TYPE | APPLICATION | RELEASE | FEATURE CODES |
|---|---|---|---|---|---|---|
| XXXXXX ⋮ ZZZZZZ | AAAA ⋮ CCCC | AA ⋮ NN | PPN ⋮ | DEFINITY ⋮ | RX ⋮ RY | AAA ⋮ NNN |
| ↑ 1200 | ↑ 1204 | ↑ 1208 | ↑ 1212 | ↑ 1216 | ↑ 1220 | ↑ 1224 |

FIG. 12

| FEATURE KEYWORD | FEATURE TYPE | RANGE DEFINITION 1316 | |
|---|---|---|---|
| | | V1 | V2 |
| VALUE_X | SET | -- | -- |
| VALUE_T | CALCULATED | -- | -- |
| VALUE_Z | RANGE | 0 | 100 |
| ⋮ | ⋮ | ⋮ | ⋮ |
| ↑ 1300 | ↑ 1304 | ↑ 1308 | ↑ 1312 |

FIG. 13

REMOTE FEATURE ACTIVATOR FEATURE EXTRACTION

CROSS REFERENCE TO RELATED APPLICATION

The present application is a divisional of U.S. application Ser. No. 10/232,906, filed Aug. 30, 2002, which is incorporated fully herein in its entirety.

FIELD OF THE INVENTION

The present invention relates generally to the licensing of computational components and specifically to the licensing of computational components in telecommunication systems.

BACKGROUND OF THE INVENTION

To protect software manufacturers' copyrights in software sold to the public, manufacturer's commonly license software to the purchaser. Additionally, in many applications the purchaser has elected to pay only for certain features of software which must be selectively enabled by the manufacturer. In particular, each release or version of a particular software package for a customer premise telecommunication switching system contains a large number of features, and most customers elect to pay for only a subset of the total number of features. Features in a telecommunications switching system refer to certain specialized operations such as call hold, call transfer, automatic route selection, etc. An ongoing problem in the art is to prevent newer versions of software from being pirated and used on unauthorized hardware and/or otherwise authorized customers from actuating features for which the customer has not paid.

A number of methods have been developed to protect against such unauthorized use of software.

In one method, passwords, that allow only authorized individuals to have access to the telecommunication switching system, are used to control enablement of features or new software versions. This method is inflexible and inconvenient for customers as an authorized technician must be scheduled to enable the features, can be circumvented by a person misappropriating or misusing the password, and does not provide for periodic license verification during system operation.

In another method, a key is required to enable the software program. This solution does not solve the copying problem because the key is normally printed on the packaging of the software, and anyone can install the software as many times as they wish, however illegal it may be.

In yet another method, a special piece of hardware or "dongle" is used. The dongle is a special piece of hardware that connects to the serial or parallel port of the computer. The software running on the computer sends a random number to the dongle. The dongle performs a secret computation and returns a result. The software makes a like computation; if the two computations match, the software continues to run. To work satisfactorily, the response must include feature and version information. The use of the dongle is cumbersome when it fails. In the event that the dongle fails, the system is down until a new dongle can be physically obtained on site. Also, once made the dongle is fixed. If it was used for feature activation, a new dongle is required for each additional feature that is purchased.

A further method is to freely distribute CD-ROM disks. When the CD-ROM is inserted into a computer, the computer automatically connects to a remote server via the Internet or a dial-up connection to receive a machine-specific key. The key unlocks the software so that it can be utilized on that computer. The remote server also obtains the necessary payment information from the computer user. This method does not function well for a telecommunication switching system since it does not provide for the authorization to use different features of the same software application nor is it dependent on the version of the software being requested. In addition, it does not provide the necessary authorization of personnel to make such a request.

Another method requires the software, upon installation or first execution, to record serial number information (e.g., medium access control or MAC address) regarding predetermined hardware components of the computer system. The software permits the user a specified number of hardware serial number changes before it disables itself. This method, though effective, is unfair to users who, over time, legitimately exceed the number of permitted serial number changes through reuse of the software on a number of different systems and/or periodic replacement of some of the predetermined hardware components in a given system to upgrade or maintain the system.

The drawbacks of the various licensing methods discussed above are addressed by the licensing method discussed in detail in copending U.S. Patent Application entitled "Securing Feature Activation in a Telecommunication System", Ser. No. 09/357,679, filed Jul. 20, 1999, to Serkowski, which is incorporated herein by this reference. In this method, a valid license file is required to run a computational component. The license file contains a serial number that must be present on the hardware that is to execute the licensed software for the license to be valid and the software to be executable. In telecommunication applications, for example, the serial number of the control processor must be in the license file for the control processor to run the licensed software.

The license file also contains a name and/or version of the licensed telecommunication application and licensed features. The data structures corresponding to the features are of two types. In a type 1 feature, the data structures reflected enablement or disablement of the corresponding feature using a simple on/off state. Examples of features falling into this category include attendant vectoring, restrict call forward off net, and enhanced conferencing. In a type 2 feature, the data structures include a single numeric value and/or a name kind of entry. Examples of features falling into this category include maximum number of ports, maximum number of administered IP trunks, and call center release.

The licensing method described in the above patent application file can have drawbacks in certain applications. For example, when a computational component is sold a system record is manually created for use in later generating a license file. In telecommunication applications, material codes are used by an enterprise resource management or ERM system to track what hardware and/or software and software features were purchased. These material codes are manually converted into the corresponding items for license file generation. Manual record creation suffers not only from high labor costs but also from human error and permits abuse by personnel, who may provide a customer with additional, unpaid for features. The licensing method, though effective for controlling right-to-use for newly purchased components, can be inefficient in licensing system upgrades. In new installations, the software and/or software features that the customer is entitled to use is based entirely upon what the customer ordered. In contrast when a system upgrade is purchased, the customer is entitled to use not only the software and/or software features ordered but also the software and/or software features present on the system before installation of the upgrade.

SUMMARY OF THE INVENTION

These and other needs are addressed by the various embodiments and configurations of the present invention. The present invention provides a methodology for converting automatically material codes into corresponding items for license file generation and/or for controlling right-to-use in system upgrades.

In one embodiment of the present invention, a method is provided for creating a database record for generating a license to use a computational component. The computational component can be hardware, software, and/or an operational feature thereof. The method comprises the steps of:

(a) receiving an order identifier associated with an order related to a computational component;

(b) retrieving order information associated with the order identifier, wherein the order information comprises one or more material codes;

(c) comparing a material code with a material code mapping table to identify corresponding computational component information associated with the material code; and (d) generating a license file containing some or all of the computational component information.

The order identifier can be in any form, whether numerical, alphabetical, or alphanumerical, and identifies a record describing an order involving the computational component. An example is an order number as used in database software sold by SAP, Inc. The order can be from any type of business transaction, whether a sale, a lease or license, a free trial, a replacement, and the like.

The order information in the record can include any desirable information. For example, the order information can include not only material code(s) but also a description of the customer or customer information, the quantity of the computational component associated with each material code included in the order, and a description of the various computational components. As used herein, "material code" refers to any code, whether numerical, alphabetical, or alphanumerical, that identifies an item or type of item, such as a computational component.

The material code mapping table describes what the customer is entitled to in its license based on the material codes in the order. The computational component information in the mapping code mapping table can be of any type or form depending on the application. In one application, the computational component information comprises, for each material code, a description of the computational component, a platform description, a module type, an application description, a release description, and one or more feature codes or keywords.

A database or system record for the customer is generated from the mapping of the order information onto the computational component information. The database record reflects the correct license information. The license information, for example, includes software application name, software version, expiration date of the license, software features, and software capacities. The license file is generated from the database record.

This embodiment of the present invention can enable automatic creation of valid licenses without any manual translation between order information and computational component information. In the case of direct sales, this ability can result in significant labor savings and a reduction in erroneous data entry. In the case of indirect sales, customers and/or distributors can place an order and generate their software license files using a website without having to contact or otherwise involve personnel of the supplier/manufacturer. This ability can save substantial time, reduce errors, reduce support costs of the supplier/manufacturer, reduce abuse, and provide high levels of customer satisfaction.

In yet another embodiment of the present invention, a method is provided for creating a database record for generating a license in a system upgrade. The method comprises the steps of:

(a) providing a transaction record comprising first information associated with an order, the order relating to a first computational component and/or feature thereof, and a configuration file comprising second information different from the first information, the configuration file relating to a telecommunication switch and/or server;

(b) comparing some or all of the first information with some or all of the second information to form a system record comprising both first and second information; and (c) generating a license file using the system record.

The first and second information can be any type or form of information associated with a computational component. For example, the first and second information describes features and capacities associated with one or more computational components. The first information is typically generated from order information associated with the order, and the second information is typically generated from the translation files of the switch and/or server being upgraded by items in the order. A feature extraction tool or FET can be used to extract the second information from the translation files. As used herein, a "feature" refers to an operational aspect of a computational component.

In the comparing step, predefined priority rules can be used to determine when to use first and second information for a given field in the system record, when the two types of information differ. Generally, the system record includes all the features in the order plus all the features that were already on the switch/server.

The licensing method can be effective for controlling not only right to use for newly purchased components but also right to use for system upgrades. The method considers the software and/or software features both ordered by the customer and present on the system before installation of the upgrade.

The feature extraction tool can allow the feature activation system to create valid software licenses for an upgrade without any manual translation between existing features and capacities and license information. In the case of direct sales, this ability can result in significant labor savings and prevent errors since a technician does not have to log onto the switch/server, read the feature and capacities and then manually update the license information on the system. In the case of indirect sales, this ability can allow distributors and customers to place a software upgrade order and then run the tool, upload the output of the tool into the manufacturer's/supplier's web site and generate their license files without having to contact personnel of the manufacturer/supplier. This can save time, reduce errors, reduce the manufacturer's/supplier's support costs, and provide high levels of customer satisfaction. By encrypting the FET output, the feature extraction tool prevents the fraudulent modification of feature settings (e.g. adding a feature or increasing a capacity).

These and other advantages will be apparent from the disclosure of the invention(s) contained herein.

The present application is related to U.S. patent application Ser. Nos. 10/231,999, entitled "FLEXIBLE LICENSE FILE FEATURE CONTROLS" to Walker et al.; 10/232,508, entitled "LICENSE MODES IN CALL PROCESSING" to Serkowski et al.; 10/232,507, entitled "LICENSE FILE SERIAL NUMBER TRACKING"; to Serkowski et al.; 10/231,957, entitled "LICENSING DUPLICATED SYSTEMS" to Serkowski et al.; and 10/232,647, entitled "SOFTWARE LICENSING FOR SPARE PROCESSORS" to Walker et al., each of which were filed on Aug. 30, 2002 and are incorporated herein by reference.

The above-described embodiments and configurations are neither complete nor exhaustive. As will be appreciated, other embodiments of the invention are possible utilizing, alone or in combination, one or more of the features set forth above or described in detail below.

BRIEF DESCRIPTION OF THE DRAWINGS

FIG. 7 depicts the data structures in the system and transaction records;

FIG. 12 depicts the data structures in the material code mapping table;

FIG. 13 depicts the data structures in the switch configuration file mapping table.

DETAILED DESCRIPTION

Overview of the Licensing Verification System

Figure 1:
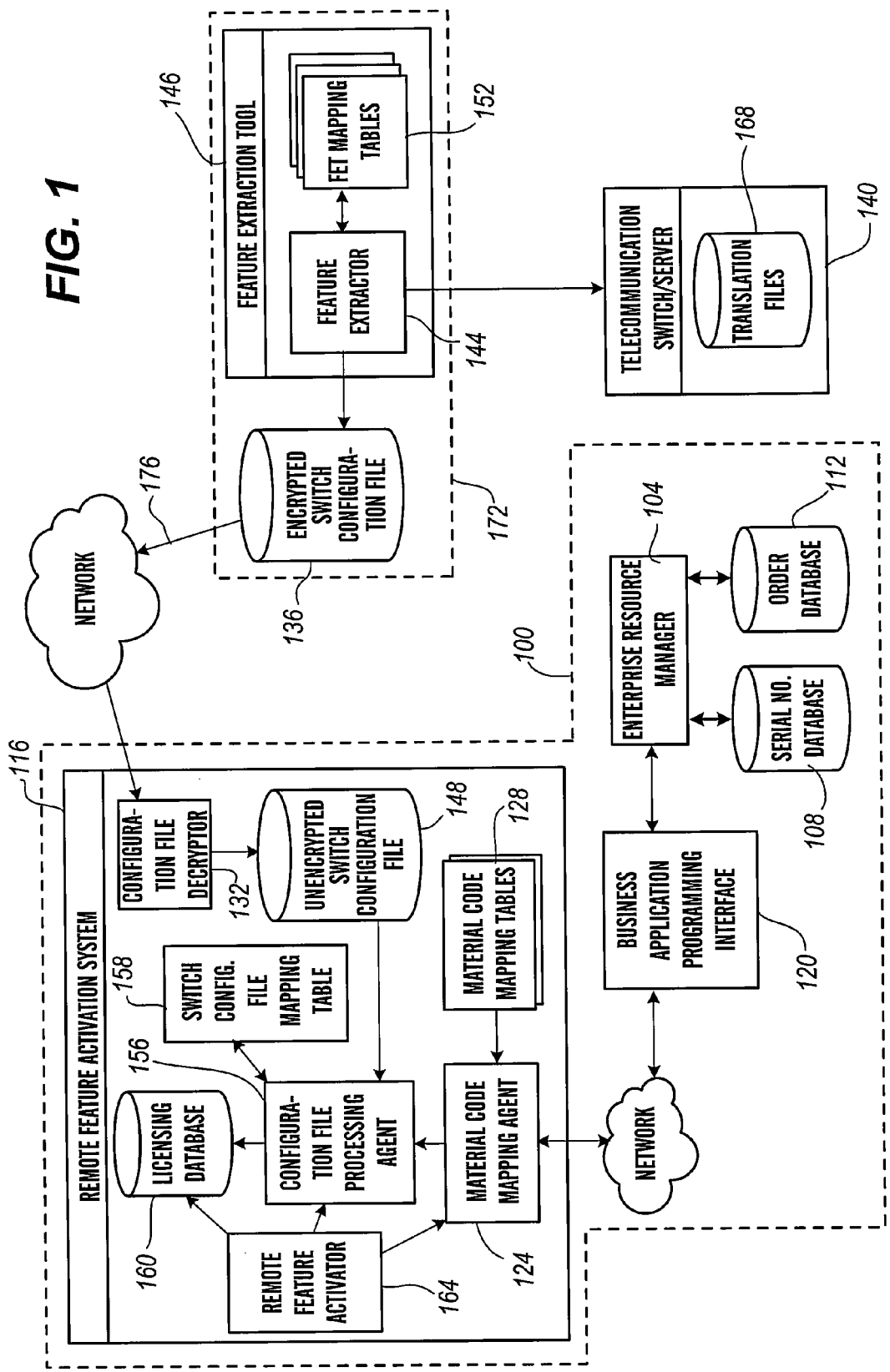
FIG. 1 is a block diagram depicting a licensing system according to a first embodiment of the present invention.

Referring to FIG. 1, the licensing verification system 100 comprises an enterprise resource manager or ERM 104 to add, update, modify, and validate entries in a serial number database 108 and an order database 112, a remote feature activation or RFA system 116 to supervise the licensing verification and issuance processes, and a business application programming interface or BAPI 120 to process messages between the ERM 104 and RFA system 116. The RFA system 116 comprises a material code mapping agent 124 to form and populate transactions records by mapping order records in the order database 112 using material code mapping tables 128, a configuration file decryptor 132 to convert encrypted configuration files 136 for switch/server 140 received from a feature extraction tool 146 into unencrypted switch/server configuration files 148, a configuration file processing agent 156 to update the transaction records output by mapping agent 124 using the feature information in the unencrypted switch configuration file 148 and the switch configuration file mapping table 158, and a remote feature activator 164 to supervise the operation of the remote feature activation system 100 and completion of the transaction records to update the licensing database 160. The feature extraction tool or FET 146 comprises a feature extractor 144 to access the translation file(s) 168 to generate the encrypted configuration file 136 by using configuration mapping tables 152 to map the features in translation files 168 onto fields in the configuration file 136.

The operation of the ERM 104 is discussed in detail in copending U.S. Application entitled "LICENSE FILE SERIAL NUMBER TRACKING", Ser. No. 10/232,507 to Serkowski, et al., filed concurrently herewith and incorporated herein by this reference. The ERM 104 is configured to cause the addition, update, modification, and validation of entries in the databases 108 and 112 based on predetermined rules or policies. The ERM 104 can be any suitable enterprise resource planning software, such as ERP or Enterprise Resource Planning software sold by SAP.

Figure 10:
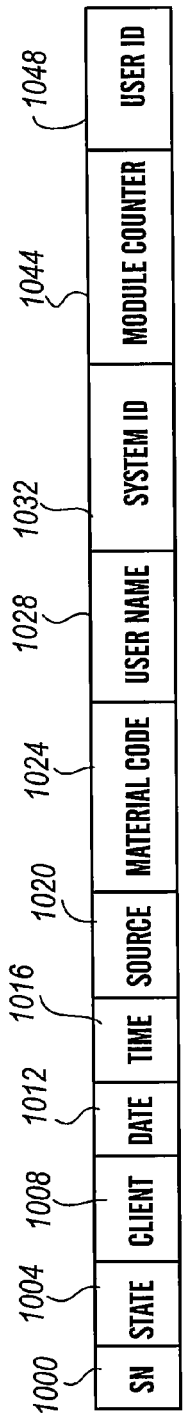
FIG. 10 depicts the data structures in the serial number database.

The serial number database 108 comprises a plurality of records corresponding to hardware (e.g., processors or IP services interface cards) sold to customers. The database 108 includes two tables, namely a current table and a historical table. The data structures in the two tables are similar and are shown in FIG. 10. Referring to FIG. 10, each entry includes fields for the serial number 1000, serial number status or licensing state 1004 (valid inactive (serial number is available for licensing but is not yet assigned to a license file), valid active (serial number is available for licensing and has been assigned to a license file, invalid open (serial number is unavailable for licensing), invalid returned (serial number is unavailable for licensing and has been returned by the customer), and invalid scrap (serial number is unavailable for licensing and has been retired), client or purchaser 1008, date 1012 and time 1016 of creation of the entry, source 1020 of update or creation of the entry, material code(s) 1024 (e.g., a material code in SAP that defines the hardware having the serial number), name of the user 1028 who created the entry, system identifier (SID) 1032 indicating the system to which the serial number has been assigned for licensing, module counter 1044 indicating the licensing identification number of the processor for use in switch/server systems with multiple processing modules, and user identifier 1048 of the user who created the entry. These entries are typically automatically generated when the serial number is assigned during manufacturing and whenever the licensing state of the serial number is changed using the RFA system 116.

Figure 9:
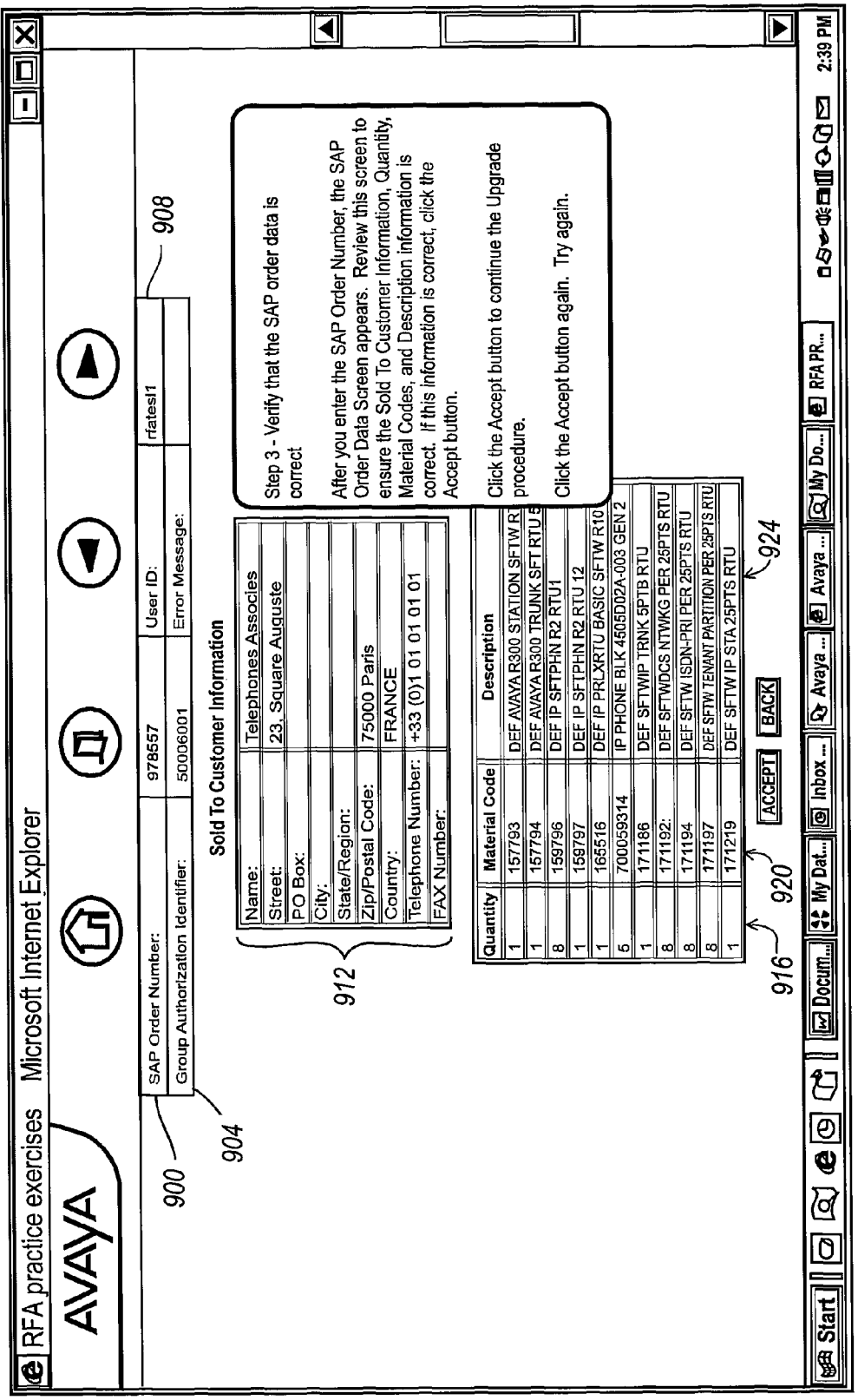
FIG. 9 is a screenshot of an order in the order database.

The order database 112 comprises a plurality of records corresponding to hardware and software corresponding to each customer order. The data structures can vary depending upon the precise implementation of the ERM 104. FIG. 9 shows the data structures in one implementation. Each order entry comprises an SAP order number 900, a group authorization identifier 904, a user id 908, customer name, address, and contact information fields 912, and a series of quantity, material code, and description fields 916, 920, and 924, respectively, identifying the contents of each order. The entries for the orders can be generated manually or with the aid of a configurator.

BAPI 120 processes messages conveyed between the ERM 104 and the RFA system 116. In a typical licensing transaction, a serial number-based inquiry is forwarded via BAPI 120 to ERM 104 by RFA system 116. In response to serial number inquiries and updates from the RFA system, ERM 104 accesses the serial number database 108 to read/write serial number information accordingly. A serial number inquiry response is then returned via BAPI 120 to RFA system 116 by ERM 104. The RFA system 116 then forwards via BAPI 120 a status update to ERM 104, and ERM 104 then updates the database 108 and returns via BAPI 120 a serial number update response to the RFA system 116. The serial number-based inquiry to ERM 104 includes a source to identify the requesting system and an activity code to indicate the processing to be performed by ERM 104. The RFA system 116 will use two activity codes, namely inquiry and update, to validate the current status of a serial number when it is entered into an RFA transaction and to update the status after the serial number is saved in a system record. Other activity codes include history (to return all historical activity for a serial number) and add (to insert a new serial number entry in a table). The RFA system 116 uses a number of transaction statuses to characterize a serial number transaction, namely PENDING COMPLETION to indicate that the status of the serial number has been validated in ERM 104 and is ready to be updated to a VALID ACTIVE state (discussed below), PENDING ERROR to indicate that the status of the serial number in ERM 104 indicates that it cannot be updated to VALID ACTIVE and the user must enter a new serial number, PENDING VALIDATION to indicate that the serial number has not been validated due to a system problem and the user must resubmit the serial number for validation, and COMPLETE to indicate that the status of the serial number in ERM 104 has been updated to VALID ACTIVE.

The RFA system 116 comprises a material code mapping agent 124 to populate transactions records by mapping order records in the order database 112 using material code mapping tables 128. As discussed below with reference to FIG. 10, the mapping agent 124 reads each of the material codes 920 in an order (FIG. 9) and converts the material code to a corresponding hardware and/or software component or feature. The pertinent fields in a transaction record are then populated.

The data structures in the material code mapping tables 128 used by the mapping agent 124 are shown in FIG. 12. The fields in the table are material code 1200, description 1204 of the item or feature corresponding to the material code, platform (or platform type) 1208 (which typically is a type or model of hardware, such as a processor), module type 1212 (e.g., whether or not the processor is a PPN, a remote spare processor, or a WAN spare processor), application 1216 (e.g., DEFINITY sold by Avaya Inc.), release 1220 (release or version of the application), and feature code(s) 1224 (e.g., FEAT_ARS on locked, FEAT_CWFD on locked, VALUE_PORT 1000 1000 or the V1 and V2 values for the telephony ports, and VALUE_CCRELEASE 9.1 9.1 or the release identifier for the corresponding application). Depending on the purpose of a given material code (e.g. licensing of base software, feature addition, capacity addition, or release upgrade), one or more of the fields 1208, 1212, 1220, and 1224 may not be populated.

The RFA system 116 further includes a configuration file decryptor 132 to convert encrypted configuration files 136 for a switch/server 140 uploaded into the RFA system 116 into unencrypted configuration files 148.

Figure 5:
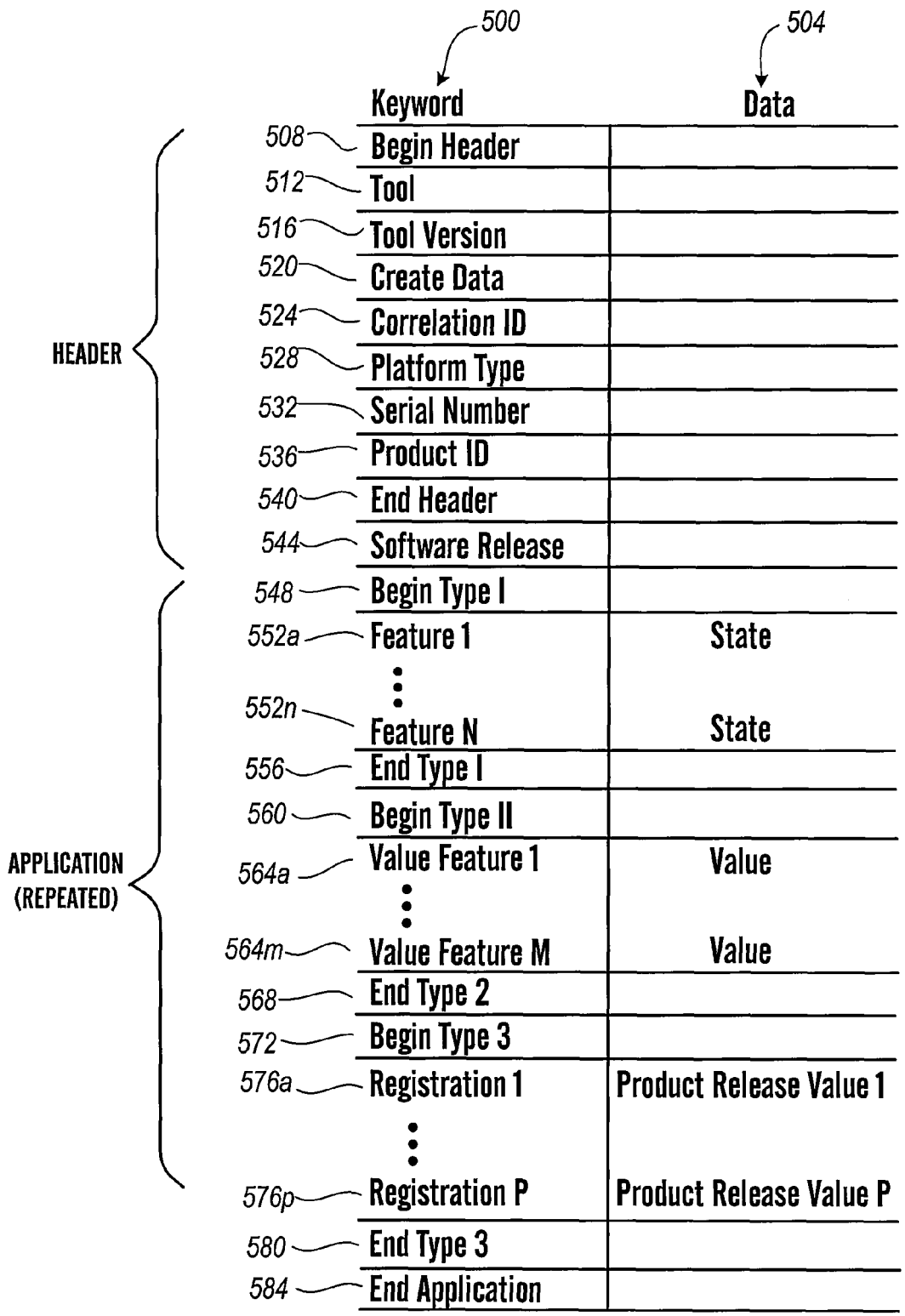
FIG. 5 depicts the data structures in the switch configuration file output by the configuration file processing agent.

Referring to FIG. 5, the data structures for the switch/server configuration files 148 output by the configuration file decryptor 132 are depicted. The table comprises a series of keywords 500 and corresponding data 504. The keyword fields comprise a field for the beginning of the header 508, tool 512 (this field describes the type of tool that produced the configuration file 136), tool version 516 (this field denotes the version of the tool identified in the tool field 512), create date 520 (the date of creation of the output file), correlation identifier or ID 524 (this value allows the output file to be correlated with the switch/server being upgraded), platform type 528, serial number 532, product ID or PID 536, ending of the header 540, software release 544 (the software load version of the system prior to the upgrade), the beginning of the Type I features 548, the various Type I features 552a-n, the ending of the Type I features 556, the beginning of the Type II features 560, the various Type II features 564a-m, the ending of the Type II features 568, the beginning of the Type III features 572, the various Type III features 576a-p, the ending of the Type III features 580, and the ending of the application 584.

The RFA system 116 comprises a configuration file processing agent 156 to apply validation rules to confirm that a configuration file 148 is valid and populate the fields of transaction records using switch configuration files 148 and switch configuration file mapping table 158, and a Remote Feature Activator 164 to apply rules for converting transaction records into valid system records. As will be appreciated, a transaction record differs from a system record in that the transaction record does not yet qualify as a system record. Some of the fields in the transaction remain unpopulated, and/or the transaction record fails to comply with or satisfy certain predefined rules or policies required for all system records. The operation of the configuration file processing agent 156 is described below with reference to FIGS. 6A and 6B.

The data structures for the switch configuration file mapping table are shown in FIG. 13. Moving from left to right, the column 1300 corresponds to the feature keyword, the column 1304 to the feature type, and columns 1308 and 1312 to the range definition 1316. Columns 1308 and 1312 set forth, for each feature keyword, the corresponding values for V1 and V2.

The RFA system 116 maintains, in the licensing database, a current system record indicating the features and capacities of each switch/server. The system record serves as the input for the creation of a license file. When a system is purchased or upgraded, information regarding the features and capacities purchased by the customer is needed to create or update the system record. The purpose of the BAPI 120 is to allow the RFA system 116 to retrieve the required information from the order record in the order database 112.

The data structures in the transaction and system records are shown in FIG. 7. Each record comprises the following fields: system ID 700, sold-to customer information 704, distributor information 708, dealer information 712, customer information 716, authorized user access information 720, license generation information 724 (which comprises platform type 728, serial number 732, PID 736, application name 740, software version 744, and expiration date 748), Type I feature information 752 (which comprises Type I ON/OFF feature settings—right to use 756 and Type I ON/OFF feature settings—features activated 760), Type II feature information 764 (which comprises Type II value feature right to use 768, Type II value feature range 772 (containing a number or numerical range defined by V1 and V2), and Type II value feature settings 776 (containing the value setting in the range of V1 to V2 (inclusive) for each Type II feature with a right to use)), Type III feature information 780 (which comprises Type III registration feature right to use 784, Type III registration feature release 788 (which has a release value for each Type III feature with a right to use), Type III registration feature range 792 (containing a number or numerical range defined by V1 and V2), and Type III registration feature setting 796 (containing a number or numerical range defined by V1 and V2)), license delivery information 797, module information 798 for systems containing multiple processors (e.g. main server with WAN Spare Processors), application information 799, and system record history 789.

Figure 8:
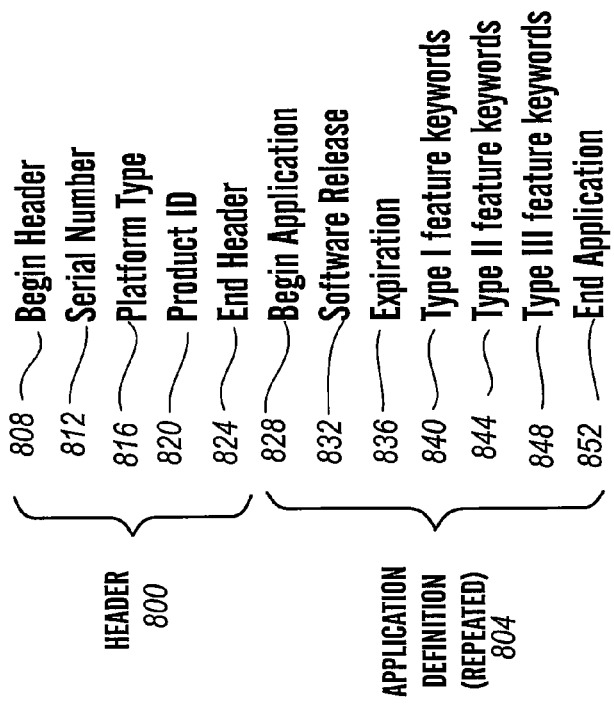
FIG. 8 depicts the data structures in the license file generated by the remote feature activator from the transaction record.

The data structures in the license file, which is generated from the system record, are discussed in detail in copending U.S. patent application Ser. No. 10/231,999, entitled "FLEXIBLE LICENSE FILE FEATURE CONTROLS", filed on Aug. 30, 2002, Walker et al., which is incorporated herein by reference in its entirety. The data structures for the license file are shown in FIG. 8. Referring to FIG. 8, the license file comprises a header section 800 and one or more application definition sections 804. For a system using more than a single licensed application, the application definition section will be repeated in the license file for each of the controlled telecommunications applications. The header section 800 comprises a header beginning 808, serial number field 812, platform type field 816, PID field 820, and header ending 824. Each application definition section 804 comprises application beginning 828, software release field 832, license expiration field 836, Type I feature key words fields 840, Type II feature key words fields 844, Type III feature key words fields 848, and application ending 852. The software application name is defined in the "Begin Application" field 828.

The remote feature activator 164 is the supervisor or controlling application for the various other modules in the RFA system 116. The activator 164 can be embodied in any suitable script. Other operations of the activator 164 are discussed in copending U.S. Application entitled "LICENSE FILE SERIAL NUMBER TRACKING", Ser. No. 10/232,507 to Serkowski et al., filed concurrently herewith. Such other operations include the generation of a license file from a system record in the licensing database and forwarding of the license file to a controlling and/or controlled application of a remote switch and/or server.

Figures 3, 4A, 4B:
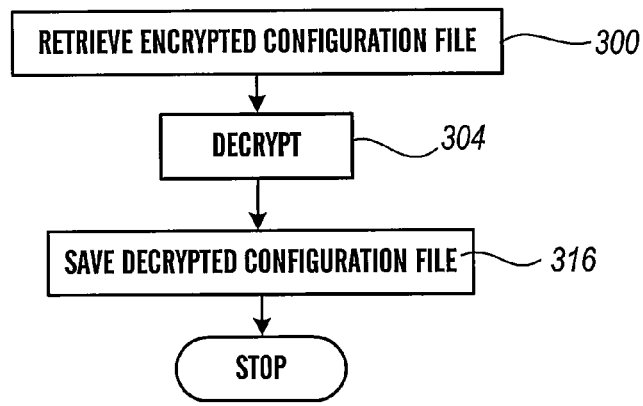
FIG. 3 is a flowchart depicting the operation of the configuration file processing agent.
FIG. 4A depicts the data structures in the configuration mapping table for Type I features.
FIG. 4B depicts the data structures in the configuration mapping table for Type II features.

The feature extraction tool or FET 146 accesses the translation file(s) 168 to generate a configuration file 136 when a switch/server 140 is upgraded from an earlier version of software that was not licensed using the licensing system 100. As noted above, the file 136 is used to generate a license for the upgraded system. The configuration file 136 is generated by the feature extractor 144 using FET mapping tables 152 to map features in translation files 168 to corresponding feature codes or keywords recognized by the RFA system 116. The data structures for the FET mapping tables are shown in FIGS. 4A and 4B. The mapping tables are for Type I and II features, respectively. As discussed in detail in copending U.S. patent application Ser. No. 10/231,999, entitled "FLEXIBLE LICENSE FILE FEATURE CONTROLS" to Walker et al., filed concurrently herewith and incorporated herein by this reference, Type I features are features having a simple on/off state. Type II features are features having a numeric value. Type III features are features having a product ID, a release number, and a numeric value.

Referring to FIG. 4A, the data structures for the mapping table for Type I features are depicted. The table comprises fields for the feature keyword 400 (which identifies a corresponding feature and is the variable that the features in the switch/server are being mapped to), the title string on the switch administration terminal or SAT screen 404, the page number 408 (the pertinent page of the customer options form), the field ID 412 (the feature field used in the translation files 168 or the feature identifier that is being mapped from), feature setting 416 (defines the rules for setting the features in the configuration file based on the feature setting(s) in the translation files of the switch/server, e.g., "Copy" indicates that the setting from the switch is used directly to populate the setting in the configuration file), and the platform applicability 420 (defines the platform types for which the feature is valid).

Referring to FIG. 4B, the data structures for the mapping table for Type II features are depicted. The table comprises fields for the feature keyword 424, the title string on the SAT screen 428, the page number 432, the field ID 436, and the rules for setting the feature value 440.

The tool 146 is typically executed on a customer's personal computer or PC 172 and the encrypted configuration file 136 uploaded onto communication link 176 and forwarded to the RFA system 116 for processing by the configuration file processing agent 156. The data is stored in the PC 172 as an encrypted file to prevent the user from tampering with the file in an attempt to illicitly acquire additional features or capacities. The configuration file 136 includes a correlation ID to match the file with the customer and the switch/server to which it applies. As will be appreciated, the file transfer to RFA system can be done automatically without user input.

The feature extraction tool 146 is preferably a single-user tool that provides a simple user interface and step-by-step instructions for generating the feature file consistent with the tool being used by untrained customers. The tool, for example, could provide the customer with instructions on returning the encrypted file to the RFA system and with the option for automatically e-mailing the feature file to the RFA system if an e-mail connection is available.

Operation of the Material Code Mapping Agent

Figure 11:
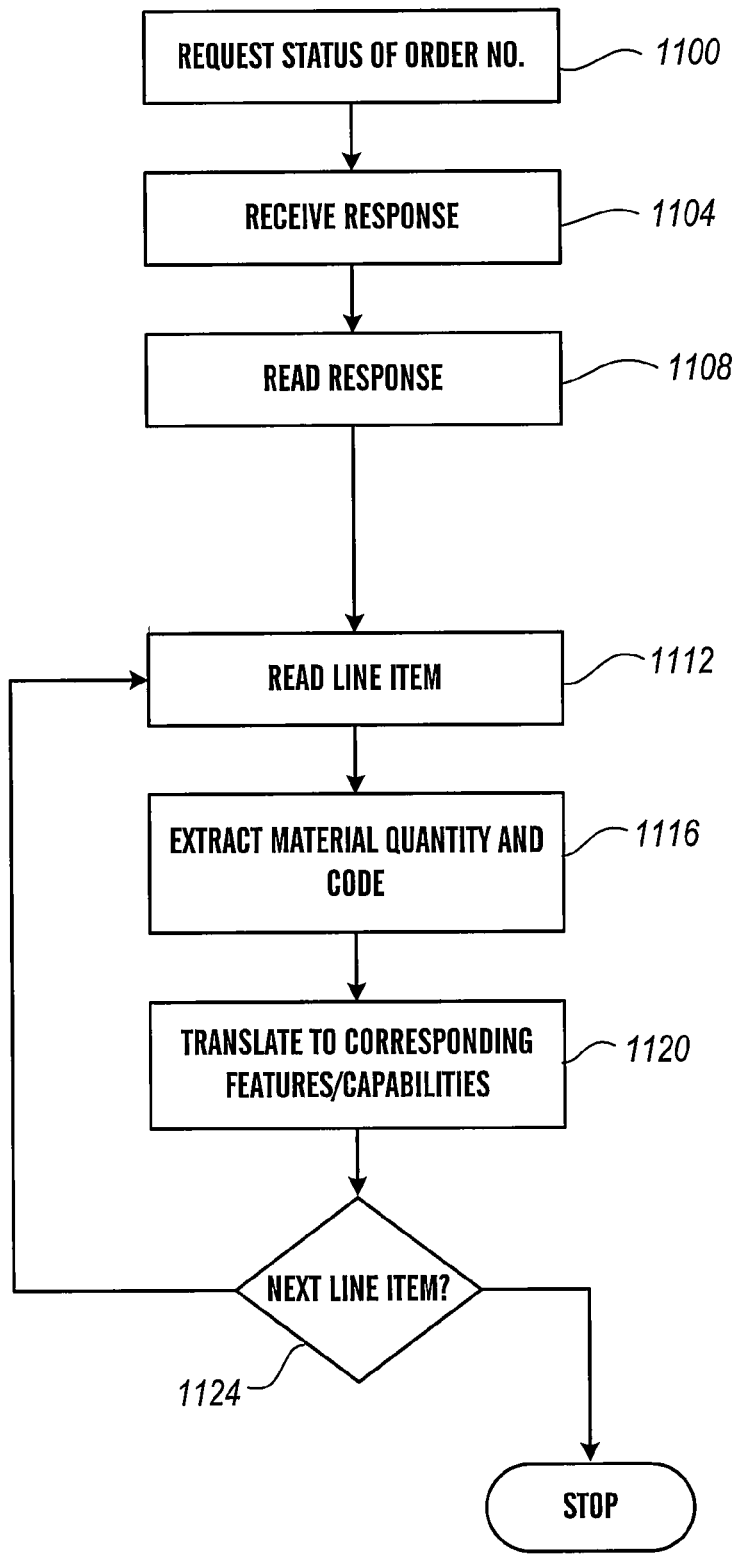
FIG. 11 is a flowchart depicting the operation of the mapping agent.

Referring to FIG. 11, the operation of the material code mapping agent will now be discussed. In response to a command from the RFA activator 164 (which is typically in turn in response to a request from a user), the mapping agent 124 in step 1100 forwards a status request to the BAPI 120. The request includes the SAP order number.

The BAPI 120 forwards the request to the ERM 104. The ERM 104 retrieves from the order database 112 the order corresponding to the order number. The BAPI 120 thereafter interacts with the ERM 104 to verify the success of the transaction, validate the order type, validate the order status (e.g., complete, being processed, awaiting scheduling, and product delivered awaiting installation), extract the SAP customer number to be used for user authorization to view the order, extract the customer sold-to name and address to be displayed by a graphic user interface of the RFA system 116, and, for each line item of the order, extract the material quantity and material code for the translation to its corresponding features and capacities during the mapping operation. The response to the status request comprises the order status, the status (success or failure) of the remote function call, the line items on the order, packing information, and partner/customer name and address information.

Upon receipt of the response from the BAPI 120 in step 1104, the mapping agent 124 creates a transaction record and performs mapping to populate the various fields of a transaction record. In step 1108, the mapping agent 124 reads the order status, the status (success or failure) of the remote function call, packing information, and partner/customer name and address information and populates the appropriate fields in the transaction record. In step 1112, the mapping agent 124 reads the first line item in the response. In step 1116, the mapping agent 124 extracts the material quantity and material code from the first line item. In step 1120, the mapping agent 124 reads the material code mapping table (FIG. 12), compares the material code in the first line item with the various material codes in the table, and translates the material code to the corresponding features and/or capabilities in the table (e.g., finds the corresponding description 1204, platform 1208, module type 1212, application 1216, release 1220, and/or feature code(s) 1224 for the material code). The located information and quantity information is then used to populate the corresponding fields in the transaction record as appropriate. If the material code in the order is not found in the mapping tables 128, then the material is not used to populate fields in the transaction record. In step 1124, the mapping agent 124 determines whether or not there is a next (unprocessed) line item in the response. When there is a next line item, the mapping agent returns to step 1112 and repeats steps 1116 and 1120 for the line item. When there is no next line item, the mapping agent 124 saves the transaction record in the licensing database and terminates operation with respect to that transaction.

Operation of the Feature Extraction Tool

Figure 2:
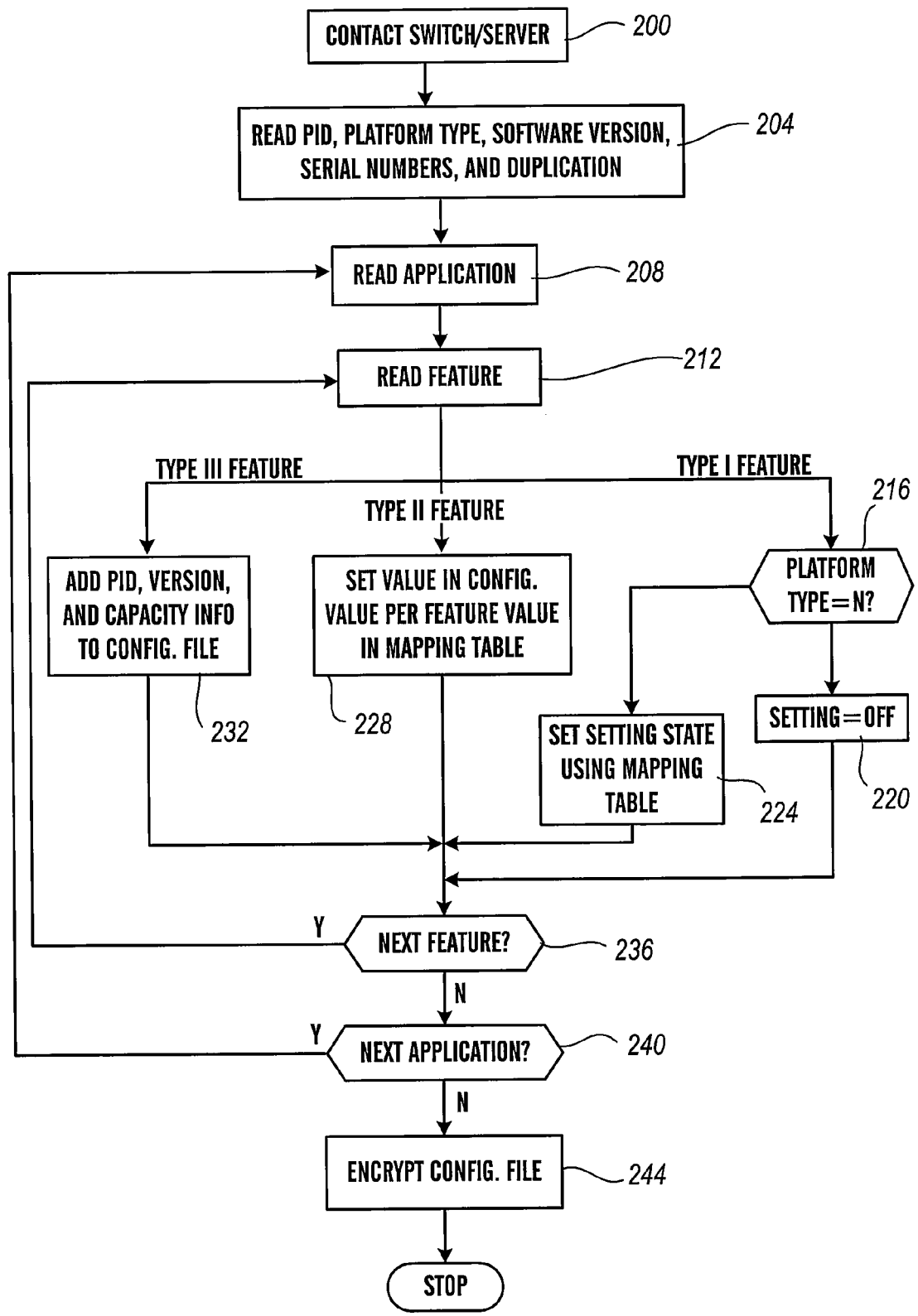
FIG. 2 is a flowchart depicting the operation of the feature extraction tool according to the first embodiment.

The operation of the feature extraction tool 146 will now be discussed with reference to FIG. 2.

In step 200, the feature extraction tool 146 contacts the switch/server 140 by any suitable technique. In step 204, the feature extractor 144 reads the PID, platform type, software version, serial number(s), and duplication information off from the translation files 168 stored in the memory of the switch/server 140. In step 208, the feature extractor 144 next reads the application information and in step 212 the first feature entry for the application in the files 168.

The information acquired from the feature entry depends upon the type of feature, namely whether the feature is a Type I, II, or III feature. For a Type I feature, the feature extractor 144 first determines in step 216 if the platform type of the telecommunication switch/server 140 is marked with an "N" in the Platform Applicability column 420 of the Type I feature mapping table (FIG. 4A). If so, the setting state for the feature keyword is set in step 216 to "OFF". If not, the setting state for the feature keyword is set in step 224 in accordance with the feature setting column 416 of the configuration mapping table for Type I features (FIG. 4A). For a Type II feature (which are capacity/value features), the feature extractor 144 in step 228 sets the value in the configuration file 136 for the corresponding feature keyword in accordance with the feature value column 440 in the Type II configuration mapping table (FIG. 4B). As noted, when the feature extractor 144 has no data for a Type I or II feature keyword the keyword is included in the file 136 with the data as set forth in the corresponding mapping table. For a Type III feature (which are registration features), the feature extractor 144 in step 232 reads the PID, version, and capacity information for the corresponding feature keyword. When the feature extractor 144 does not have data related to a given Type III feature keyword, the keyword is omitted from the switch configuration file 136. When the feature extractor 144 does not have any information for the application PID or software release keyword within an application section, the keyword is included without any data. The information read for the pertinent type of feature is used to populate the corresponding fields in the configuration file 136.

In step 236, the feature extractor 144 determines if there is a next (unprocessed) feature in the translation files 168 for the subject application. If so, the feature extractor 144 repeats steps 212 and the pertinent of steps 228, 232, and steps 216, 220, and 224. If not, the feature extractor 144 next determines in step 240 if there is a next (unprocessed) application in the translation files 168. When there is a next application, the feature extractor 144 returns to step 208 and repeats the ensuing steps as appropriate. When there is no next application, the feature extractor 144 encrypts the file 136 in step 244. The user then uploads the file 136 into the RFA system 116.

For security reasons, the tool 144 both saves the files 136 and transmits the files in an encrypted form. As will be appreciated, when the file is saved in a plain text or unencrypted form the customer can alter the file to provide unpaid for features/capacities. These unpaid for features/capacities will in certain situations be carried over into the license for the upgraded system.

Operation of the Configuration File Decryptor

The encrypted file is received and downloaded by the configuration file decryptor 132 in step 300 (FIG. 3). The agent 132 decrypts the file in step 304 to form a plain text file. Finally, in step 316, the resulting unencrypted switch configuration file 148 is saved.

Operation of the Configuration File Processing Agent

Figure 6A:
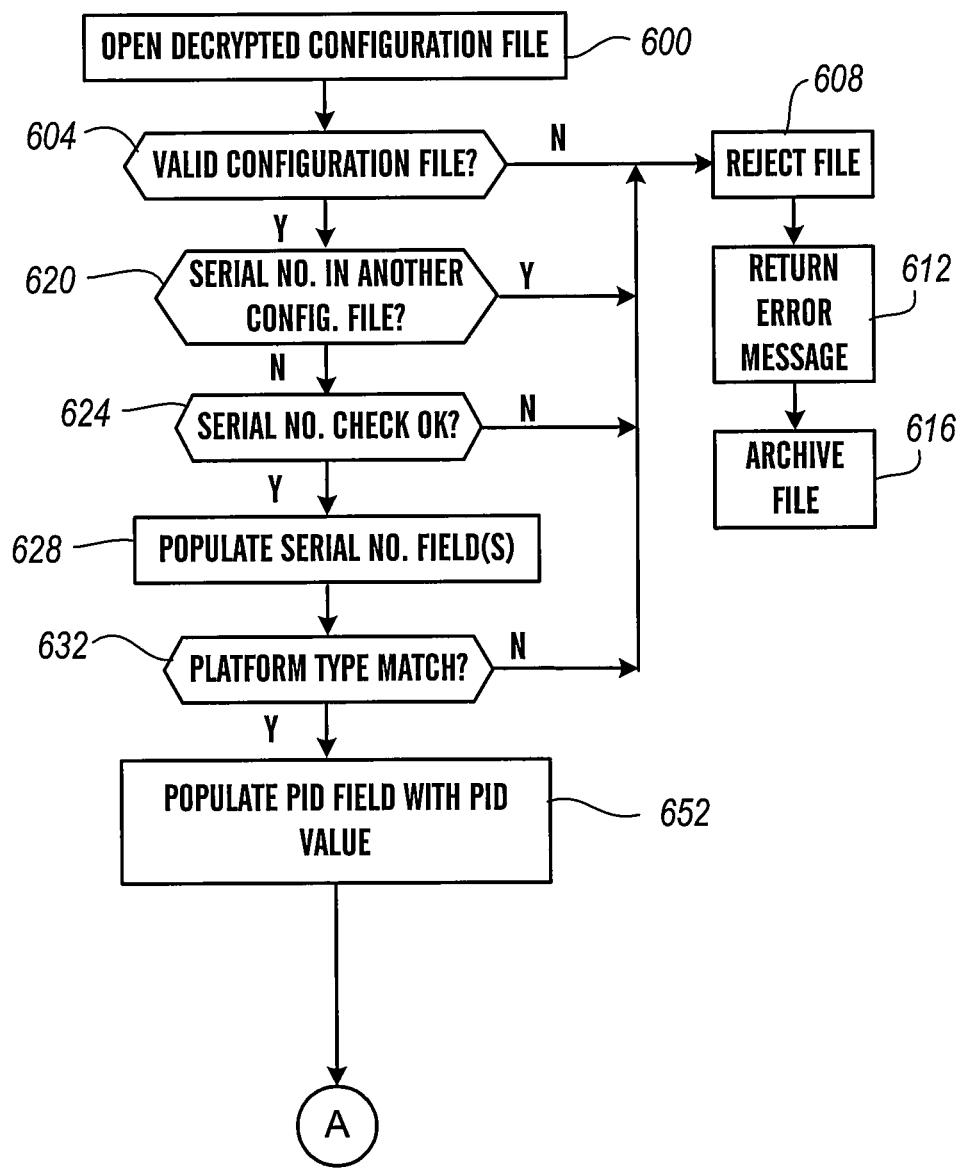
FIGS. 6A and B are flowcharts depicting the operation of the system record generating agent.

The operation of the configuration file processing agent 156 will now be discussed with reference to FIGS. 6A and 6B.

In step 600, the agent 156 opens, for a selected switch/server, the corresponding switch configuration file 148 and transaction record previously generated by the material code mapping agent 124.

In step 604, the agent 156 determines whether or not to reject the switch configuration file before proceeding to later steps. When the switch configuration file fails to meet predetermined format requirements, has an application PID value that is not a default value or blank and that was in a previously imported switch configuration file 148, includes a correlation ID (which is unique for a given switch/server) that is in another switch configuration file 148 that was successfully imported, and/or has a correlation ID that does not match the transaction ID of the corresponding transaction record, the switch configuration file is rejected in step 608 and not used to alter the corresponding transaction record. In step 612 an error message is returned to the user with a brief description of the error and information on whom to contact to resolve the issue. In step 616, the rejected switch configuration file, the error that caused the file to be rejected, the user name of the person who tried to import the file, the date and time, and the associated transaction record ID are archived in the licensing database as part of the system record history. When the foregoing conditions are not found to exist, the agent 156 proceeds to step 620.

In step 620, the agent 156 determines if the serial number in the configuration file 148 is contained in another successfully uploaded configuration file 148. When the same serial number appears in two separate configuration files 148, it is an indication of attempted fraud. When the same serial number appears in another successfully uploaded configuration file 148, the agent 156 proceeds to step 608. When the same serial number does not appear in another successfully uploaded configuration file, the agent proceeds to step 624.

In step 624, the agent 156 checks the serial number strings in the configuration file against the entries in the serial number database 108 to ensure that the serial number(s) is valid for licensing (i.e. the state is VALID INACTIVE). When all of the serial numbers pass the serial number database check, the agent 156 proceeds to step 628 and uses the serial number(s) to populate the serial number field(s) in the transaction record (when the field(s) are not already populated). When one or more of the serial number(s) fail the serial number database check, the agent 156 proceeds to step 608.

In step 632, the agent 156 determines if the platform type of the switch/server in the transaction record matches the platform type string in the switch configuration file. If not, the agent 156 proceeds to step 608. If so, the agent 156 proceeds to step 640.

In step 652, the agent 156 uses the PID value to populate the PID in the transaction record, regardless of whether the value is a default or not and that field is already populated.

In step 656, the agent 156 reads the next (first) application information in the configuration file 148 and in step 660 the next (first) feature entry for that application.

The ensuing steps depend on whether the feature corresponding to the feature keyword is a Type I, II, or III feature.

For a Type I feature, the agent 156 proceeds to step 664 and determines whether the setting state is ON. If so, the feature keyword and associated information is added in step 668 to the Type I right to use list (or field 756) in the transaction record (FIG. 7), if the feature keyword is not already present from the SAP order. These are features for which the customer has already paid. Next, in step 681, the processing agent 156 sets the corresponding feature activation setting field 760 (FIG. 7) to ON in accordance with the setting in the configuration file. If the setting is OFF in step 664, the agent 156 does not add the feature to the right to use list, instead it proceeds to step 671 in which the agent 156 determines if the feature keyword is already in the transaction's Type I feature right to use list from the material code mapping. If so, then the processing agent 156 proceeds to step 681 and sets the feature activation setting field 760 (FIG. 7) to OFF to match the configuration file. If not, the processing agent proceeds to 687. Features that are OFF have not previously been paid for by the customer and are therefore not added to the right to use list. However, if the feature is in the right to use list as a result of the action material code mapping but was previously OFF on the switch/server it is left OFF in the transaction record, in case it is a feature that the customer does not want activated (the feature can be activated later if desired since it is in the right to use list). As will be appreciated, importing a switch configuration file has no impact on the Type I feature right-to-use field previously populated by the material code mapping agent 156 during material code mapping.

In any event, the agent 156 next proceeds to step 687 in which the agent 156 determines if there are any remaining features for the application requiring processing. If so, the agent 156 returns to step 660 with respect to that feature. If not, the agent 156 next determines in step 688 if there is any application the features of which have not yet been processed. If so, the agent 156 returns to step 656 with respect to that application. If not, the agent 156 terminates.

Returning again to step 660 for a Type II feature in the configuration file 148, the agent 156, in step 684, processes the Type II feature.

Figure 14:
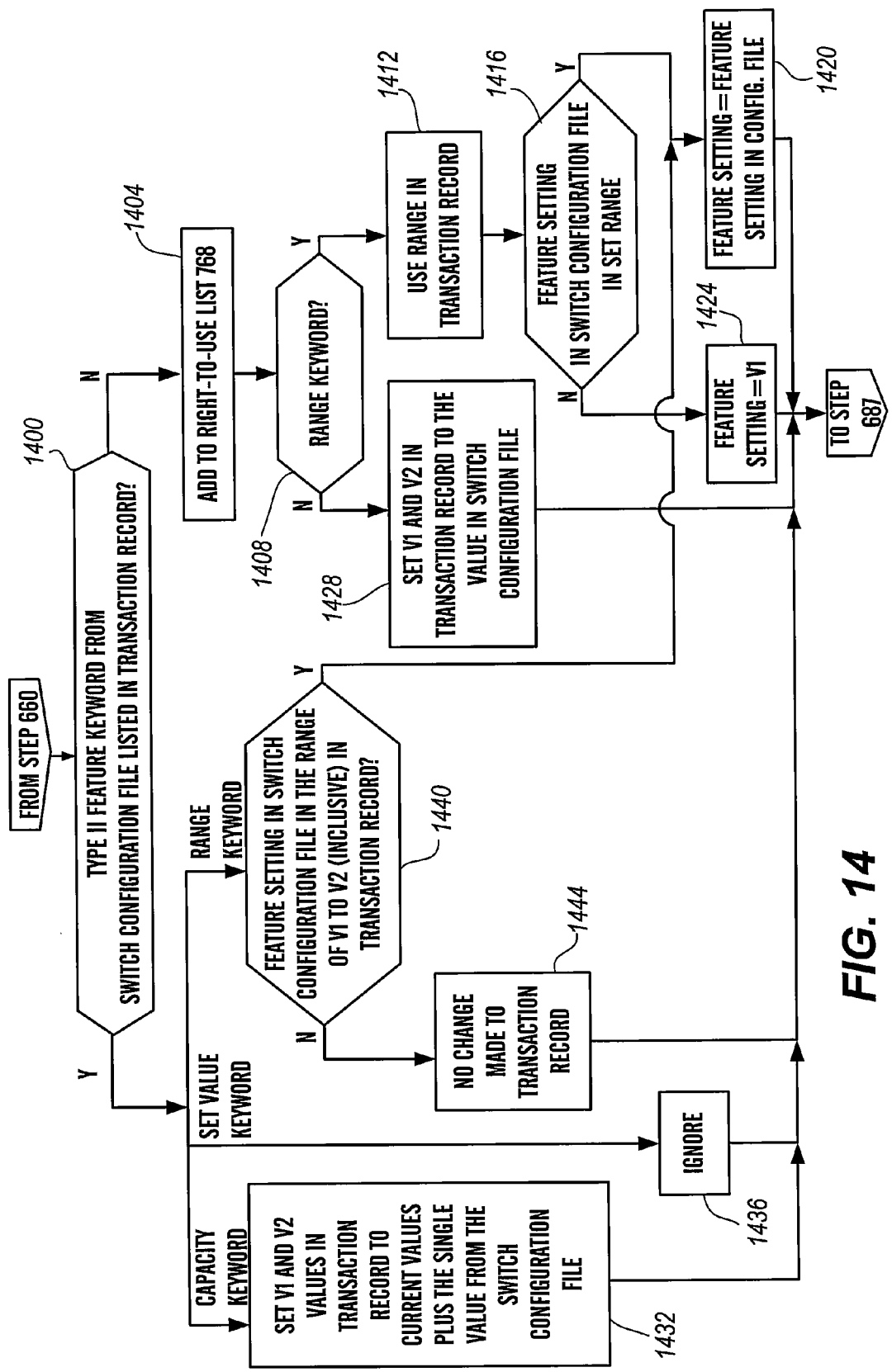
FIG. 14 is a flowchart depicting a subroutine of the algorithm of FIG. 6B.

A more detailed flowchart of this process is depicted in FIG. 14. Referring to FIG. 14, the agent 156, in step 1400, determines, for the selected Type II feature keyword from the switch configuration file 148 whether the feature is also listed in the corresponding entry in the transaction record.

When the feature is not listed in the transaction record, the agent 156 proceeds to step 1404. In step 1404, the selected Type II feature keyword is added to the right-to-use list 768.

In step 1408, the agent 156 determines whether the feature type for the keyword is "Range" in column 1304 (FIG. 13) of the mapping table 158. If so, the licensed range values 1308 and 1312 in the mapping table 158 are used in step 1412 to populate the V1 and V2 values in the value feature range 772 (FIG. 7) in the transaction record. In step 1416, the agent 156 determines whether or not the feature setting in the switch configuration file 148 is in the value feature range in the mapping table 158. When the feature setting is in the value feature range, the feature setting field 776 (FIG. 7) in the transaction record in step 1420 is set to the feature setting value in the configuration file 148. When the feature setting in the configuration file 148 is not in the value feature range, the feature setting field 776 in step 1424 is set equal to the value for V1. Returning again to step 1408, when the feature keyword does not have a feature type of "Range" in the mapping table 158, the agent 156 in step 1428 sets the values for V1 and V2 in the value feature range 772 (FIG. 7) in the corresponding transaction record to the respective value in the switch configuration file 148.

Returning again to step 1400, when the selected Type II feature keyword in the switch configuration file 148 is not listed in the corresponding transaction record, the ensuing actions of the agent 156 depend on whether the keyword is a capacity keyword, a set value keyword, or a range keyword, as defined in the mapping table 158. A capacity keyword provides a capacity value for a switch/server function. Examples of capacity keywords include maximum ports, maximum concurrently registered IP stations, maximum administered IP trunks, and maximum number of logged in ACD agents. A set value keyword is a feature that has non-numeric settings. Examples of set value features include offer category (e.g., allowed settings of A or B), G3 version (e.g., allowed settings of V1 -V11) and call center release (e.g., allowed settings of pre-8.1, 8.1, 8.3, 9.1, and 11.1). A range keyword is a feature that customers are allowed to set within an allowed range. An example of a range feature is location (allowed values are 1 for domestic and 2 for international).

When the feature keyword is a capacity keyword, the agent 156 in step 1432 sets the values for V1 and V2 in the corresponding transaction record to the current value plus the single value from the switch configuration file 148. Thus, when the current value in the transaction record for telephony ports is 25 for both V1 and V2 and the port value in the configuration file 148 is 100, the value for both V1 and V2 is set to 125 (as the values for V1 and V2 are the same).

When the feature keyword is a set value keyword, the agent 156 in step 1436 ignores the set value keyword for purposes of populating the value feature setting field 776 transaction record.

When the feature keyword is a range keyword, the agent 156 in step 1440 determines whether or not the feature setting in the switch configuration file 148 is in the range of V1 to V2 (inclusive) in the corresponding feature range field 772 of the transaction record. If so, the feature setting value in step 1420 is set equal to the feature setting value in the configuration file 148. If not, in step 1444 no change is made to the field 772 in the transaction record.

Figure 6B:
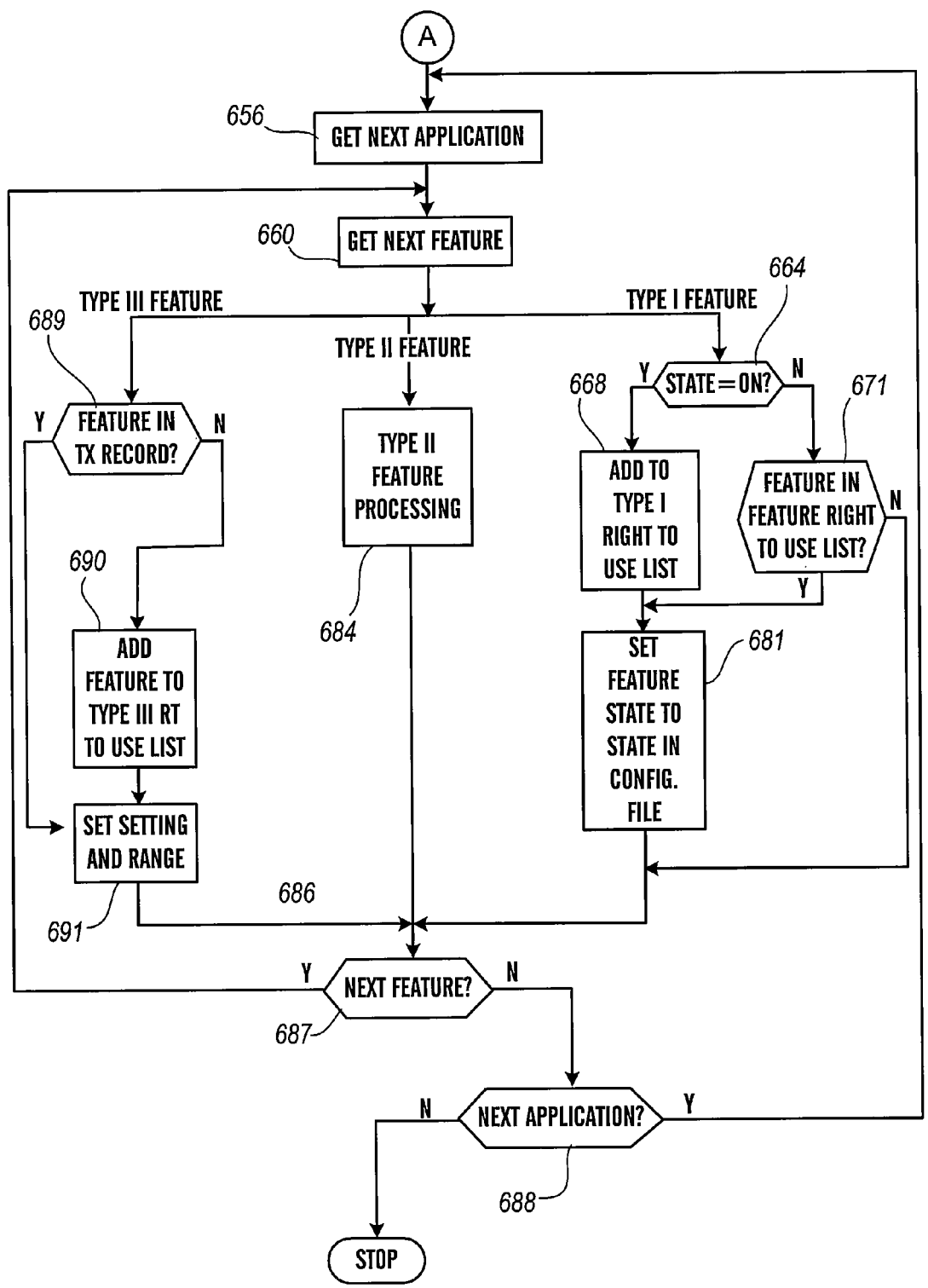

After completing any of steps 1420, 1424, 1432, 1436, and 1444, the agent 156 proceeds to step 687 of FIG. 6B.

Returning again to FIG. 6B, the agent 156, in step 687 determines whether there is a next (unprocessed) feature in the current application. If so, the agent 156 proceeds to step 660. If not, the agent 156 next determines in step 688 whether there is a next (unprocessed) application. If so, the agent 156 returns to step 656. If not, the agent terminates.

Returning again to step 660 for a Type III feature in the configuration file, the agent 156 proceeds to step 689 and determines whether or not the Type III feature product ID and release combination listed in the configuration file is also in the transaction record. When the Type III feature product ID and release combination are listed in the transaction record, the agent 156 sets the range (V1 and V2) field 792 in the transaction record to the current values plus the single value from the switch configuration file. Since the range value V1 equals V2, the feature setting field 796 is also set to this single value V1=V2. When the Type III feature product ID and release combination are not listed in the transaction record, the agent 156 adds the product ID and release to the corresponding fields 736 and 788 of the transaction record, and sets the range (V1 and V2) field 792 in the transaction record to the value from the switch configuration file. Since the range value V1 equals V2, the feature setting field 796 is also set to the single value from the switch configuration file. The agent 156 next proceeds to step 687 and determines whether there is a next (unprocessed) feature in the current application. If so, the agent 156 proceeds to step 660. If not, the agent 156 next determines in step 688 whether there is a next (unprocessed) application. If so, the agent 156 returns to step 656. If not, the agent terminates the Type III feature population subroutine.

When the fields of the transaction record are fully populated and the transaction record satisfies other selected database rules and policies, the agent 156 submits the transaction record to the activator 164. The activator 164 converts the transaction record to a system record to be used for generation of a license file.

A number of variations and modifications of the invention can be used. It would be possible to provide for some features of the invention without providing others.

For example in one alternative embodiment, RFA system 116 (and/or some or all of its various components), ERM 104, BAPI 120, and/or tool 144 are implemented, in whole or part, as software and/or an application specific integrated circuit.

In another alternative embodiment, the division of the various functions performed by the system 116 (and/or some or all of its various components), ERM 104, BAPI 120, and/or tool 144 modules are different.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A method for creating a database record for providing a license to use a computational component, comprising:
 a processor receiving an order identifier, wherein the order identifier identifies a record describing an order involving the computational component, wherein the order is a previous business transaction related to a computational component;
 the processor retrieving order information in the record associated with the order identifier, wherein the order information comprises at least one material code, wherein the at least one material code at least identifies the computational component;
 the processor comparing the at least one material code with at least one material code mapping table, wherein the mapping table describes what a customer is entitled to license based on the material codes in the order;
 the processor identifying corresponding computational component information associated with the at least one material code;
 the processor identifying a material code from the at least one material code mapping table that is not in the order information, but has been previously paid for;
 the processor generating a license file associated with a license for the computational component, wherein the license file contains at least some of the computational component information and the material code from the at least one mapping table that is not in the order information, but was previously paid for, wherein the license file includes one or more of a software application name, a software version, an expiration date of the license, one or more software features, and one or more software capacities; and
 repeating the comparing step for each of a plurality of material codes in the order information.

2. The method of claim 1, wherein the computational component information comprises a plurality of a description of the computational component, a platform description, a module type, an application description, a release description, and a feature code.

3. A non-transitory computer readable medium comprising computer-executable instructions to perform a method for creating a database record for providing a license to use a computational component, the instruction comprising:
 instructions to receive an order identifier, wherein the order identifier identifies a record describing an order involving the computational component, wherein the order is a previous business transaction related to a computational component;
 instructions to retrieve order information in the record associated with the order identifier, wherein the order information comprises at least one material code, wherein the at least one material code at least identifies the computational component;
 instructions to compare the at least one material code with at least one material code mapping table, wherein the mapping table describes what a customer is entitled to license based on the material codes in the order;
 instructions to identify corresponding computational component information associated with the at least one material code;
 instructions to identify a material code from the at least one material code mapping table that is not in the order information, but has been previously paid for;
 instructions to generate a license file associated with a license for the computational component, wherein the license file contains at least some of the computational component information and the material code from the at least one mapping table that is not in the order information, but was previously paid for, wherein the license file includes one or more of a software application name, a software version, an expiration date of the license, one or more software features, and one or more software capacities; and instructions to repeat the comparing step for each of a plurality of material codes in the order information.

4. A system for creating a database record for providing a license to use a computational component, comprising:

an input operable to receive an order identifier, wherein the order identifier identifies a record describing an order involving the computational component, wherein the order is a previous business transaction related to a computational component;

an interface operable to retrieve order information in the record associated with the order identifier, wherein the order information comprises at least one material code, wherein the at least one material code at least identifies the computational component;

a memory;

a processor in communication with the memory, the processor operable to execute:

a material code mapping module operable to:
compare the at least one material code with at least one material code mapping table, wherein the mapping table describes what a customer is entitled to license based on the material codes in the order;
identify corresponding computational component information associated with the at least one material code;
identify a material code from the at least one material code mapping table that is not in the order information, but has been previously paid for; and a license generation module operable to generate a license file associated with a license for the computational component, wherein the license file contains at least some of the computational component information and the material code from the at least one mapping table that is not in the order information, but was previously paid for, wherein the license file includes one or more of a software application name, a software version, an expiration date of the license, one or more software features, and one or more software capacities, wherein the processor is further operable to repeat the comparing step for each of a plurality of material codes in the order information.

5. The system of claim 4, wherein the computational component information comprises a plurality of a description of the computational component, a platform description, a module type, an application description, a release description, and a feature code.

6. A system for creating a database record for providing a license to use a computational component, comprising:

an input operable to receive an order identifier, wherein the order identifier identifies a record describing an order involving the computational component, wherein the order is a previous business transaction related to a computational component;

an interface operable to retrieve order information in the record associated with the order identifier, wherein the order information comprises at least one material code, wherein the at least one material code at least identifies the computational component;

a memory;

a processor in communication with the memory, the processor operable to execute:

a material code mapping module operable to:
compare the at least one material code with at least one material code mapping table, wherein the mapping table describes what a customer is entitled to license based on the material codes in the order;
identify corresponding computational component information associated with the at least one material code;
identify a material code from the at least one material code mapping table that is not in the order information, but has been previously paid for;

a license generation module operable to generate a license file associated with a license for the computational component, wherein the license file contains at least some of the computational component information and the material code from the at least one mapping table that is not in the order information, but was previously paid for, wherein the license file includes one or more of a software application name, a software version, an expiration date of the license, one or more software features, and one or more software capacities; and a feature activator operable to generate a license file containing at least some of the computational component information, wherein the processor is further operable to repeat the comparing step for each of a plurality of material codes in the order information.

7. The system of claim 6, wherein the computational component information comprises a plurality of a description of the computational component, a platform description, a module type, an application description, a release description, and a feature code.

8. The computer readable medium of claim 3, wherein the computational component information comprises a plurality of a description of the computational component, a platform description, a module type, an application description, a release description, and a feature code.

* * * * *

UNITED STATES PATENT AND TRADEMARK OFFICE
CERTIFICATE OF CORRECTION

PATENT NO. : 8,620,819 B2
APPLICATION NO. : 12/609846
DATED : December 31, 2013
INVENTOR(S) : Walker et al.

Page 1 of 1

It is certified that error appears in the above-identified patent and that said Letters Patent is hereby corrected as shown below:

In the Claims

Claim 1, Column 16, line 7, please delete "a" and insert --the-- therein.

Claim 1, Column 16, line 23, please delete the "," after "information".

Claim 1, Column 16, line 29, please delete the "," after "information".

Claim 3, Column 16, line 64, please delete the "," after "information".

Claim 3, Column 17, line 3, please delete the "," after "information".

Claim 4, Column 17, line 15, please delete "a" and insert --the-- therein.

Claim 4, Column 17, line 35, please delete the "," after "information".

Claim 4, Column 17, line 41, please delete the "," after "information".

Claim 4, Column 17, line 47, please delete "step" and insert --operation-- therein.

Claim 6, Column 18, line 26, please delete the "," after "information".

Claim 6, Column 18, line 32, please delete the "," after "information".

Claim 6, Column 18, line 41, please delete "step" and insert --operation-- therein.

Signed and Sealed this
Twenty-seventh Day of May, 2014

Michelle K. Lee
*Deputy Director of the United States Patent and Trademark Office*